US012621486B2

(12) United States Patent
Wang et al.

(10) Patent No.: US 12,621,486 B2
(45) Date of Patent: May 5, 2026

(54) COMPUTER-IMPLEMENTED METHOD AND SYSTEM FOR VIDEO CODING

(71) Applicant: City University of Hong Kong, Kowloon (HK)

(72) Inventors: Shiqi Wang, Kowloon (HK); Jiancong Chen, Kowloon (HK)

(73) Assignee: City University of Hong Kong, Kowloon (HK)

( * ) Notice: Subject to any disclaimer, the term of this patent is extended or adjusted under 35 U.S.C. 154(b) by 167 days.

(21) Appl. No.: 18/183,279

(22) Filed: Mar. 14, 2023

(65) Prior Publication Data

US 2024/0314357 A1    Sep. 19, 2024

(51) Int. Cl.
| | |
|---|---|
| *H04N 19/59* | (2014.01) |
| *H04N 19/124* | (2014.01) |
| *H04N 19/154* | (2014.01) |
| *H04N 19/172* | (2014.01) |

(52) U.S. Cl.
CPC ........... *H04N 19/59* (2014.11); *H04N 19/124* (2014.11); *H04N 19/154* (2014.11); *H04N 19/172* (2014.11)

(58) Field of Classification Search
None
See application file for complete search history.

(56) References Cited

U.S. PATENT DOCUMENTS

| | | | | | |
|---|---|---|---|---|---|
| 6,721,439 | B1 * | 4/2004 | Levy | ............... | H04N 21/23892 |
| | | | | | 375/E7.206 |
| 8,094,716 | B1 * | 1/2012 | Chen | ...................... | H04N 19/14 |
| | | | | | 375/240.18 |

| | | | | | |
|---|---|---|---|---|---|
| 8,290,038 | B1 * | 10/2012 | Wang | ..................... | H04N 19/15 |
| | | | | | 375/240.03 |
| 8,767,825 | B1 * | 7/2014 | Wang | ................... | H04N 19/115 |
| | | | | | 375/240.1 |
| 8,798,137 | B2 * | 8/2014 | Po | ........................ | H04N 19/115 |
| | | | | | 375/240.12 |
| 8,897,370 | B1 * | 11/2014 | Wang | ..................... | H04N 19/59 |
| | | | | | 375/240.2 |
| 9,615,098 | B1 * | 4/2017 | Yi | .......................... | H04N 19/14 |
| 10,623,775 | B1 * | 4/2020 | Theis | ..................... | G06N 3/045 |
| 10,757,419 | B2 * | 8/2020 | Kottke | ................. | H04N 19/154 |
| 11,025,914 | B1 * | 6/2021 | Yuen | .................... | H04N 19/149 |
| 11,070,813 | B2 * | 7/2021 | Socek | .................. | H04N 19/137 |

(Continued)

OTHER PUBLICATIONS

G. J. Sullivan, J.-R. Ohm, W.-J. Han, and T. Wiegand, "Overview of the high efficiency video coding (HEVC) standard," IEEE Transactions on circuits and systems for video technology, vol. 22, No. 12, pp. 1649-1668, 2012.

(Continued)

*Primary Examiner* — Mohammad J Rahman
(74) *Attorney, Agent, or Firm* — Renner, Kenner, Greive, Bobak, Taylor & Weber

(57) ABSTRACT

A computer-implemented method for processing a video includes: (a) determining, based on one or more rate-distortion models and number of bits for a frame of the video, coding parameters for processing the frame, the coding parameters comprising a rescale parameter r and a video compression model $\lambda$, and (b) processing the frame based on the rescale parameter r and the video compression model $\lambda$ determined in (a) to form at least part of a bitstream of the video.

25 Claims, 18 Drawing Sheets

(56) References Cited

U.S. PATENT DOCUMENTS

| 11,917,188 | B2* | 2/2024 | Anderson | H04N 19/65 |
|---|---|---|---|---|
| 2005/0031034 | A1* | 2/2005 | Kamaci | H04N 19/176 375/240.03 |
| 2009/0219991 | A1* | 9/2009 | Po | H04N 19/176 375/E7.126 |
| 2010/0111163 | A1* | 5/2010 | Yang | H04N 19/177 375/240.01 |
| 2011/0090960 | A1* | 4/2011 | Leontaris | H04N 19/194 375/240.18 |
| 2012/0177108 | A1* | 7/2012 | Joshi | H04N 19/625 375/240.18 |
| 2013/0308698 | A1* | 11/2013 | Peng | H04N 19/34 375/240.03 |
| 2014/0119432 | A1* | 5/2014 | Wang | H04N 19/177 375/240.2 |
| 2014/0348246 | A1* | 11/2014 | Fu | H04N 21/44008 375/240.26 |
| 2022/0014758 | A1* | 1/2022 | Zhao | H04N 19/197 |
| 2022/0224926 | A1* | 7/2022 | Lu | G06N 3/082 |
| 2024/0137522 | A1* | 4/2024 | Kwong | H04N 19/107 |

OTHER PUBLICATIONS

J. Zhang, C. Jia, M. Lei, S. Wang, S. Ma, and W. Gao, "Recent development of AVS video coding standard: AVS3," in 2019 Picture Coding Symposium (PCS), 2019, pp. 1-5.

B. Bross, J. Chen, J. R. Ohm, G. J. Sullivan, and Y. K. Wang, "Developments in international video coding standardization after AVC, with an overview of versatile video coding (VVC)," Proceedings of the IEEE, pp. 1-31, 2021.

D. Zhang, Z. Chen, and K. N. Ngan, "Two-pass rate control for constant quality H. 264/AVC high definition video coding," in Proc. IEEE Picture Coding Symp. Citeseer, 2007, pp. 1-4.

B. Li, H. Li, L. Li, and J. Zhang, "A domain rate control algorithm for High Efficiency Video Coding," IEEE transactions on Image Processing, vol. 23, No. 9, pp. 3841-3854, 2014.

S. Wang, S. Ma, S. Wang, D. Zhao, and W. Gao, "Rate-gop based rate control for high efficiency video coding," IEEE Journal of selected topics in signal processing, vol. 7, No. 6, pp. 1101-1111, 2013.

G. J. Sullivan and T. Wiegand, "Rate-distortion optimization for video compression," IEEE signal processing magazine, vol. 15, No. 6, pp. 74-90, 1998.

L. Li, B. Li, H. Li, and C. W. Chen, "A-domain optimal bit allocation algorithm for High Efficiency Video Coding," IEEE Transactions on Circuits and Systems for Video Technology, vol. 28, No. 1, pp. 130-142, 2016.

G. Lu, W. Ouyang, D. Xu, X. Zhang, C. Cai, and Z. Gao, "DVC: An end-to-end deep video compression framework," in Proceedings of the IEEE/CVF Conference on Computer Vision and Pattern Recognition, 2019, pp. 11006-11015.

Hendry, Y.-K. Wang, T. D. J. Chen, A. Fuldseth, Y.-C. Sun, T.-S. Chang, and J. Lou, "On adaptive resolution change (ARC) for VVC," JVETM0135-v1, Jan. 2019.

M. M. Hannuksela and A. Aminlou, "Use cases and proposed design choices for adaptive resolution changing (ARC)," JVET-M0259, Jan. 2019.

T.-S. Chang, Y.-C. Sun, L. Zhu, and J. Lou, "Adaptive resolution change for versatile video coding," in 2020 IEEE International Conference on Visual Communications and Image Processing (VCIP). IEEE, 2020, pp. 261-264.

J. Nam, S. Yoo, and J. Lim, "EE1-2.1-related: RPR encoder with multiple scale factors," JVET-Y0068-v1, Jan. 2022.

S. Ma, W. Gao, and Y. Lu, "Rate-distortion analysis for H. 264/AVC video coding and its application to rate control," IEEE transactions on circuits and systems for video technology, vol. 15, No. 12, pp. 1533-1544, 2005.

J. Si, S. Ma, X. Zhang, and W. Gao, "Adaptive rate control for high efficiency video coding," in 2012 Visual Communications and Image Processing. IEEE, 2012, pp. 1-6.

B. Hosking, D. Agrafiotis, D. Bull, and N. Eastern, "An adaptive resolution rate control method for intra coding in HEVC," in 2016 IEEE International Conference on Acoustics, Speech and Signal Processing (ICASSP). IEEE, 2016, pp. 1486-1490.

G. Lu, X. Zhang, W. Ouyang, L. Chen, Z. Gao, and D. Xu, "An end-to-end learning framework for video compression," IEEE transactions on pattern analysis and machine intelligence, vol. 43, No. 10, pp. 3292-3308, 2020.

Z. Hu, G. Lu, and D. Xu, "FVC: A new framework towards deep video compression in feature space," in Proceedings of the IEEE/CVF Conference on Computer Vision and Pattern Recognition, 2021, pp. 1502-1511.

Y. Li, X. Chen, J. Li, J. Wen, Y. Han, S. Liu, and X. Xu, "Rate control for learned video compression," in ICASSP 2022-2022 IEEE International Conference on Acoustics, Speech and Signal Processing (ICASSP). IEEE, 2022, pp. 2829-2833.

Z. Zhang, Y. Li, K. Zhang, L. Zhang, and Y. He, "Optimized bit allocation for learning-based video compression," in 2022 IEEE International Symposium on Circuits and Systems (ISCAS). IEEE, 2022, pp. 1938-1942.

A. M. Bruckstein, M. Elad, and R. Kimmel, "Down-scaling for better transform compression," IEEE Transactions on Image Processing, vol. 12, No. 9, pp. 1132-1144, 2003.

W. Lin and L. Dong, "Adaptive downsampling to improve image compression at low bit rates," IEEE Transactions on Image Processing, vol. 15, No. 9, pp. 2513-2521, 2006.

J. Dong and Y. Ye, "Adaptive downsampling for high-definition video coding," IEEE Transactions on Circuits and Systems for Video Technology, vol. 24, No. 3, pp. 480-488, 2013.

R.-J. Wang, C.-W. Huang, and P.-C. Chang, "Adaptive downsampling video coding with spatially scalable rate-distortion modeling," IEEE transactions on circuits and systems for video technology, vol. 24, No. 11, pp. 1957-1968, 2014.

M. Jenab, I. Amer, B. Ivanovic, M. Saeedi, Y. Liu, G. Sines, and S. Shirani, "Content-adaptive resolution control to improve video coding efficiency," in 2018 IEEE International Conference on Multimedia & Expo Workshops (ICMEW). IEEE, 2018, pp. 1-4.

F. Zhang, M. Afonso, and D. R. Bull, "ViSTRA2: Video coding using spatial resolution and effective bit depth adaptation," Signal Processing: Image Communication, vol. 97, p. 116355, 2021.

T. Fu, K. Zhang, Y. Li, L. Zhang, S. Wang, and S. Ma, "A smart reference picture resampling approach for VVC," in 2022 Data Compression Conference (DCC). IEEE, 2022, pp. 33-42.

A. Mercat, M. Viitanen, and J. Vanne, "UVG dataset: 50/120fps 4K sequences for video codec analysis and development," in Proceedings of the 11th ACM Multimedia Systems Conference, 2020, pp. 297-302.

A. Mackin, F. Zhang, and D. R. Bull, "A study of high frame rate video formats," IEEE Transactions on Multimedia, vol. 21, No. 6, pp. 1499-1512, 2018.

M. A. Papadopoulos, F. Zhang, D. Agrafiotis, and D. Bull, "A video texture database for perceptual compression and quality assessment," in 2015 IEEE International Conference on Image Processing (ICIP). IEEE, 2015, pp. 2781-2785.

Z. Wang, E. P. Simoncelli, and A. C. Bovik, "Multiscale structural similarity for image quality assessment," in The Thrity-Seventh Asilomar Conference on Signals, Systems & Computers, 2003, vol. 2. Ieee, 2003, pp. 1398-1402.

* cited by examiner

400

402 — Decode the at least part of the bitstream to form a decoded frame corresponding to the frame 404 — Rescale the decoded frame based on the rescale parameter $r$ to form the reconstructed frame

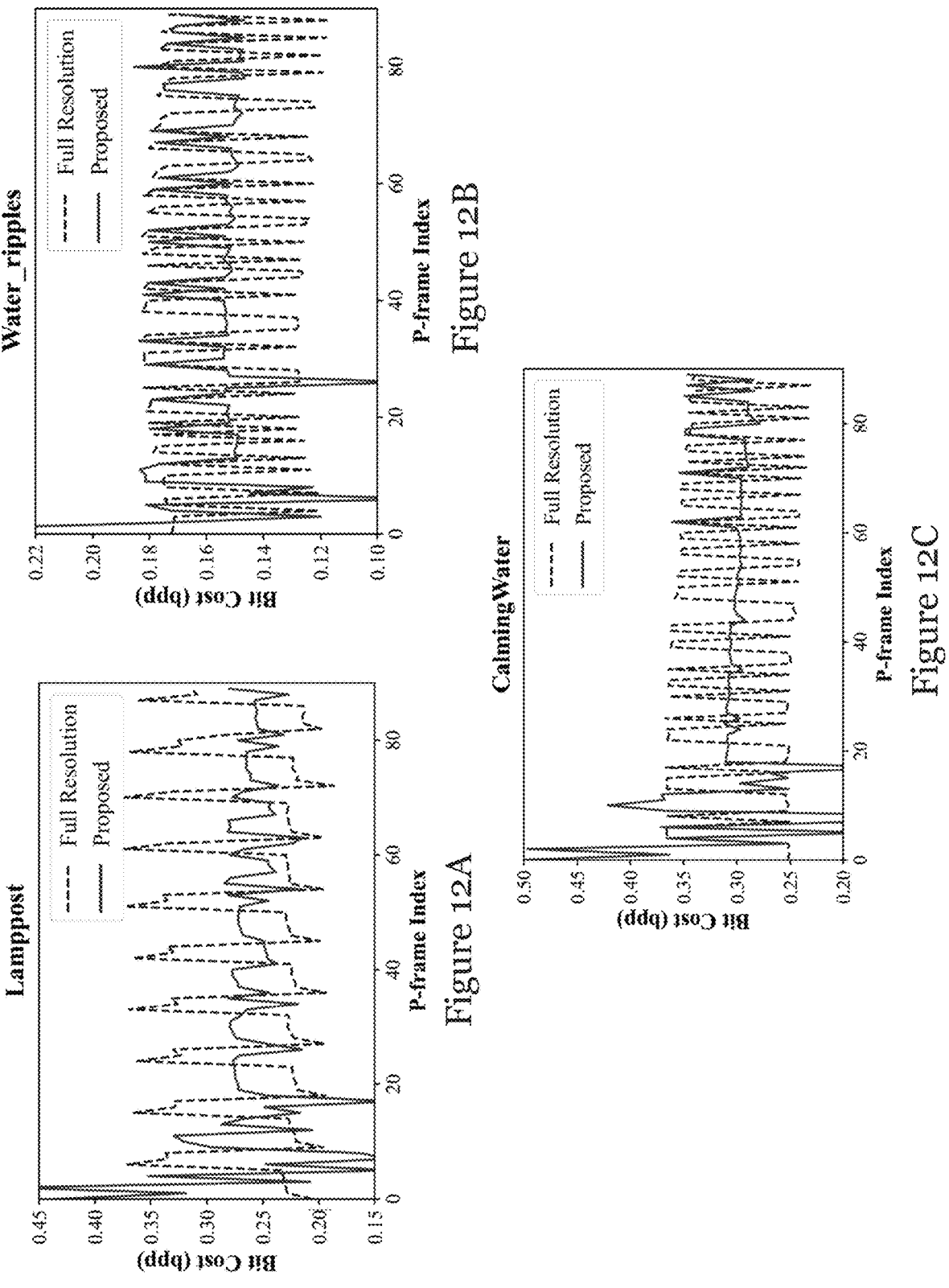

Figure 15C
Figure 15B
Figure 15A

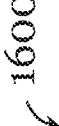
1600
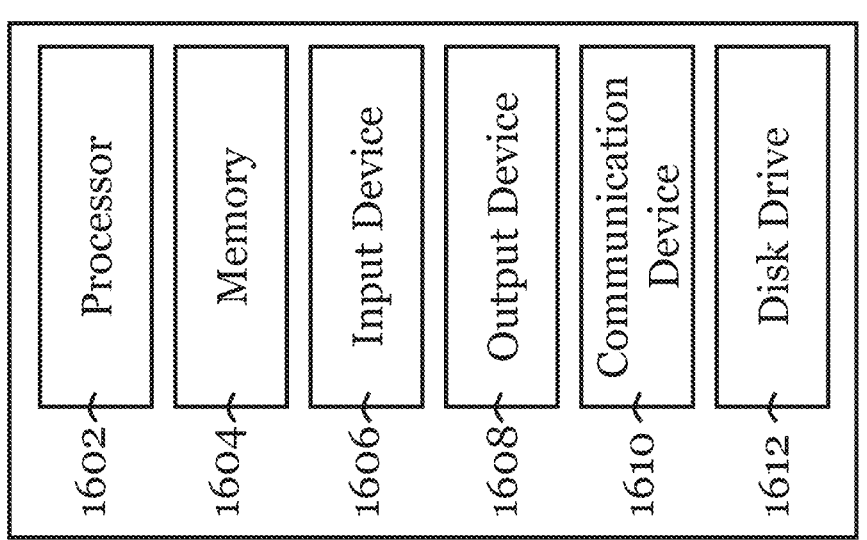
| 1602 | Processor |
| 1604 | Memory |
| 1606 | Input Device |
| 1608 | Output Device |
| 1610 | Communication Device |
| 1612 | Disk Drive |
Figure 16

COMPUTER-IMPLEMENTED METHOD AND SYSTEM FOR VIDEO CODING

TECHNICAL FIELD

The invention generally relates to processing, in particular coding, of videos.

BACKGROUND

Various techniques for end-to-end video coding are known. One problem associated with existing end-to-end video coding is a lack of sufficient operational rate-distortion (R-D) points in rate-distortion (R-D) models (functions that describe the relationship between the bitrate and expected level of distortion in the reconstructed video stream). This problem complicates rate control in video coding optimization.

SUMMARY OF THE INVENTION

In a first aspect, there is provided a computer-implemented method for processing a video (digital video data), comprising: (a) determining, based on one or more rate-distortion models and number of bits for a frame of the video, coding parameters for processing the frame, the coding parameters comprising a rescale parameter r and a video compression model $\lambda$; and (b) processing the frame based on the rescale parameter r and the video compression model $\lambda$ determined in (a) to form at least part of a bitstream of the video. The video compression model generally corresponds to a Lagrange multiplier.

Optionally, the video compression model $\lambda$ is an end-to-end video compression model.

Optionally, (b) comprises: (b)(i) rescaling the frame based on the rescale parameter r determined in (a) to form a rescaled frame; and (b)(ii) encoding the rescaled frame based on the video compression model $\lambda$ determined in (a).

Optionally, the rescale parameter r comprises a rescale value or ratio for affecting resolution of the frame. For example, the rescale value or ratio may be arranged to downsample the frame. For example, the rescale value or ratio may be arranged to upsample the frame.

Optionally, the rescale parameter r comprises a rescale value or ratio for affecting (e.g., increase or decrease) resolution of the frame and/or a reference frame associated with the frame to facilitate encoding of the frame.

Optionally, the rescale value or ratio is arranged to match resolution of the frame and resolution of the reference frame such that the resolutions are substantially the same.

Optionally, the reference frame is a frame of the video before the frame of the video.

Optionally, the frame and the reference frame are consecutive and/or continuous frames of the video.

Optionally, the frame and the reference frame are not consecutive and/or continuous frames of the video.

Optionally, the computer-implemented method further comprises: determining the number of bits for the frame.

Optionally, determining the number of bits for the frame comprises: determining number of bits for a group of picture structure of the video; and determining, based on the determined number of bits for the group of picture structure of the video, the number of bits for the frame.

Optionally, the determining of the number of bits for the group of picture structure of the video is based on:

$$R_{GOP} = \frac{R_{PicAvg} \times (N_{coded} + \Phi) - R_{coded}}{\Phi} \times N_{GOP}$$

where $R_{GOP}$ denotes number of bits for the group of picture structure, $R_{PicAvg}$ denotes average bits per frame for the video, $R_{coded}$ represents number of bits already used for the video, $N_{coded}$ represents number of already encoded frames of the video, and $\Phi$ denotes size of a sliding window.

Optionally, the determining of the number of bits for the frame is based on:

$$R_{Pic} = \frac{R_{GOP} - R_{cur\_GOP\_coded}}{\sum_{\{uncoded\ frames\}} \omega_{Pic}} \times \omega_{cur\_pic}$$

where $R_{Pic}$ denotes the number of bits for the frame, $R_{GOP}$ denotes number of bits for the group of picture structure, $R_{cur\_GOP\_coded}$ denotes number of bits already used for the group of picture structure, $\omega_{Pic}$ denotes weight(s) allocated to individual uncoded frame(s) of the video, and $\omega_{cur\_pic}$ denotes weight allocated to the frame.

Optionally, the one or more rate-distortion models comprises a rate model $f_R$ and a distortion model $f_D$.

Optionally, the rate model $f_R$ for each video compression model $\lambda$ is respectively representable as a hyperbolic function of the rescale parameter r.

Optionally, the distortion model $f_D$ for each video compression model $\lambda$ is respectively representable as a hyperbolic function of the rescale parameter r.

Optionally, (a) comprises: (a)(i) determining a set of coding parameters based the rate model $f_R$ and the number of bits for the frame, the set of coding parameters comprising multiple pairs of rescale parameter r and video compression model $\lambda$, and (a)(ii) determining, based on the multiple pairs of rescale parameter r and video compression model $\lambda$ and the distortion model $f_D$, the rescale parameter r and the video compression model $\lambda$ for processing the frame of the video.

Optionally, the determining in (a)(ii) comprises: determining, from the multiple pairs of rescale parameter r and video compression model $\lambda$, the rescale parameter r and the video compression model $\lambda$ arranged to minimize distortion based on the distortion model $f_D$.

Optionally, the computer-implemented method further comprises: (c) processing the at least part of the bitstream to reconstruct a reconstructed frame corresponding to the frame.

Optionally, the processing in (c) comprises: decoding the at least part of the bitstream to form a decoded frame corresponding to the frame or the reconstructed frame corresponding to the frame.

Optionally, the processing in (c) further comprises: rescaling the decoded frame based on the rescale parameter r to form the reconstructed frame. The reconstructed frame may have a resolution that is generally the same as a resolution of the frame.

Optionally, the computer-implemented method further comprises: (d) updating the one or more rate-distortion models based on the processing in (b) and/or a processing (e.g., decoding) of the at least part of the bitstream to reconstruct a reconstructed frame corresponding to the frame, for processing another (e.g., the next) frame of the video. In some embodiments, the updating in (d) comprises updating the one or more rate-distortion models based on the processing in (b) and/or the processing in (c), for processing another (e.g., the next) frame of the video.

Optionally, the one or more rate-distortion models comprises a rate model $f_R$ and a distortion model $f_D$, and the updating comprises updating the rate model $f_R$ based on the processing in (b), for processing another (e.g., the next) frame of the video.

Optionally, updating the rate model $f_R$ comprises: updating one or more parameters of the rate model $f_R$ based on an actual coding rate used for coding the frame and an estimated coding rate R determined based on the rescale parameter r, the video compression model $\lambda$, and the rate model $f_R$.

Optionally, the rate model $f_R$ is representable as $R=f_R(\lambda, r)=\alpha_1 \cdot r^{\beta_1}$ where R is coding rate, and $\alpha_1$ and $\beta_1$ are video content dependent parameters of video compression model $\lambda$.

Optionally, the updating of the rate model $f_R$ is based on:

$$\alpha_1^{new} = \alpha_1^{old} + \delta_\alpha (\ln R_{real} - \ln R_{est}) \times \alpha_1^{old}$$

$$\beta_1^{new} = \beta_1^{old} + \delta_\beta (\ln R_{real} - \ln R_{est}) \times \ln r$$

where $$\alpha_1^{old} \text{ and } \beta_1^{old}$$

are video content dependent parameters of the rate model $f_R$ before the update, $$\alpha_1^{new} \text{ and } \beta_1^{new}$$

are video content dependent parameters of the rate model $f_R$ after the update, $\delta_\alpha$ is a constant, $\delta_\beta$ is a constant, $R_{real}$ is the actual coding rate, and $R_{est}$ is the estimated coding rate.

Optionally, the one or more rate-distortion models comprises a rate model $f_R$ and a distortion model $f_D$, and the updating comprises updating the distortion model $f_D$ based on the processing in (c), for processing another (e.g., the next) frame of the video.

Optionally, updating the distortion model $f_D$ comprises: updating one or more parameters of the distortion model $f_D$ based on an estimated distortion measure of the frame determined based on the distortion model $f_D$ and an actual distortion measure of the frame determined based on a processing (e.g., decoding) of the at least part of the bitstream to reconstruct a reconstructed frame corresponding to the frame (e.g., the processing in (c)).

Optionally, the actual distortion measure is represented by an actual mean squared error (MSE) of the frame determined based on a processing (e.g., decoding) of the at least part of the bitstream to reconstruct a reconstructed frame corresponding to the frame (i.e., the processing in (c)). Optionally, the estimated distortion measure is represented by an estimated mean squared error (MSE) determined based on the rescale parameter r, the video compression model $\lambda$, and the distortion model $f_D$.

Optionally, the distortion model $f_D$ is representable as $D=f_D(\lambda,r)=\alpha_2 \cdot r^{\beta_2}$ where D is distortion measure, and $\alpha_2$ and $\beta_2$ are video content dependent parameters of video compression model $\lambda$.

Optionally, the updating of the distortion model $f_D$ is based on:

$$\alpha_2^{new} = \alpha_2^{old} + \delta_\alpha (\ln D_{real} - \ln D_{est}) \times \alpha_2^{old}$$

$$\beta_2^{new} = \beta_2^{old} + \delta_\beta (\ln D_{real} - \ln D_{est}) \times \ln r$$

where $$\alpha_2^{old} \text{ and } \beta_2^{old}$$

are video content dependent parameters of the rate model before the update, $$\alpha_2^{new} \text{ and } \beta_2^{new}$$

are video content dependent parameters of the rate model after the update, $\delta_\alpha$ is a constant, $\delta_\beta$ is a constant, $D_{real}$ is the actual distortion measure, and $D_{est}$ is the estimated distortion measure.

Optionally, the frame is a first frame, and the method further comprises: (e) determining, based on number of bits for a second frame and the one or more updated rate-distortion models, coding parameters for processing the second frame of the video, the coding parameters comprising a rescale parameter r and a video compression model $\lambda$; and (f) processing the second frame of the video based on the rescale parameter r and the video compression model $\lambda$ determined in (e) to form at least part of a bitstream of the video. In some examples, the second frame may be a frame immediately after the first frame.

Optionally, the computer-implemented method further comprises: repeating steps (a) to (c), and optionally (d), for each of at least some (e.g., all) frames of the video. In some embodiments, the computer-implemented method further comprises: repeating steps (a) to (d), for each of at least some (e.g., all) frames of the video. Optionally, the computer-implemented method is arranged to facilitate single-pass coding of the video.

In a second aspect, there is provided a system for processing a video (digital video data), comprising: one or more processors, and memory storing one or more programs configured to be executed by the one or more processors for performing or facilitating performing of the computer-implemented method of the first aspect. One or more of the optional features of the first aspect are applicable to the second aspect.

In a third aspect, there is provided a non-transitory computer-readable storage medium storing one or more programs configured to be executed by one or more processors, the one or more programs including instructions for performing or facilitating performing of the computer-implemented method of the first aspect. One or more of the optional features of the first aspect are applicable to the third aspect.

In a fourth aspect, there is provided a system for processing a video (digital video data), comprising: various means for performing or facilitating performing of the computer-implemented method of the first aspect. One or more of the optional features of the first aspect are applicable to the fourth aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc.

BRIEF DESCRIPTION OF THE DRAWINGS

Embodiments of the invention will now be described, by way of example, with reference to the accompanying drawings in which:

FIG. 12A is a graph showing the frame level bit cost (in terms of bpp) of the rate control algorithm in one embodiment of the invention ("Proposed", scale-adaptive rate control) and the reference DVC method ("Full Resolution", multi-pass rate control scheme without scale-adaptive coding, full resolution rate control) on processing the video sequence "Lamppost" (target bitrates=20089 kbps, only the bit cost of P-frames are shown);

FIG. 12B is a graph showing the frame level bit cost (in terms of bpp) of the rate control algorithm in one embodiment of the invention ("Proposed", scale-adaptive rate control) and the reference DVC method ("Full Resolution", multi-pass rate control scheme without scale-adaptive coding, full resolution rate control) on processing the video sequence "Water_ripples" (target bitrates=10298 kbps, only the bit cost of P-frames are shown);

FIG. 12C is a graph showing the frame level bit cost (in terms of bpp) of the rate control algorithm in one embodiment of the invention ("Proposed", scale-adaptive rate control) and the reference DVC method ("Full Resolution", multi-pass rate control scheme without scale-adaptive coding, full resolution rate control) on processing the video sequence "CalmingWater" (target bitrates=40839 kbps, only the bit cost of P-frames are shown);

FIG. 15A is an image showing another original frame;

FIG. 15B is an image showing a reconstructed frame of the original frame of FIG. 15A, reconstructed using the reference DVC method ("Anchor", sequence bitrate=7903.6 kbps, PSNR=30.53 dB, MS-SSIM=0.8812, Frame coding bits=0.0338 bpp);

FIG. 15C is an image showing a reconstructed frame of the original frame of FIG. 15A, reconstructed using the method in one embodiment of the invention ("Proposed", scale-adaptive rate control, sequence bitrate=7910.0 kbps, PSNR=34.49 dB, MS-SSIM=0.9450, Frame coding bits=0.0325 bpp); and FIG. 16 is block diagram illustrating a data processing system in some embodiments of the invention, which is operable to perform at least part of one or more of the method embodiments of the invention.

DETAILED DESCRIPTION

Figure 1:
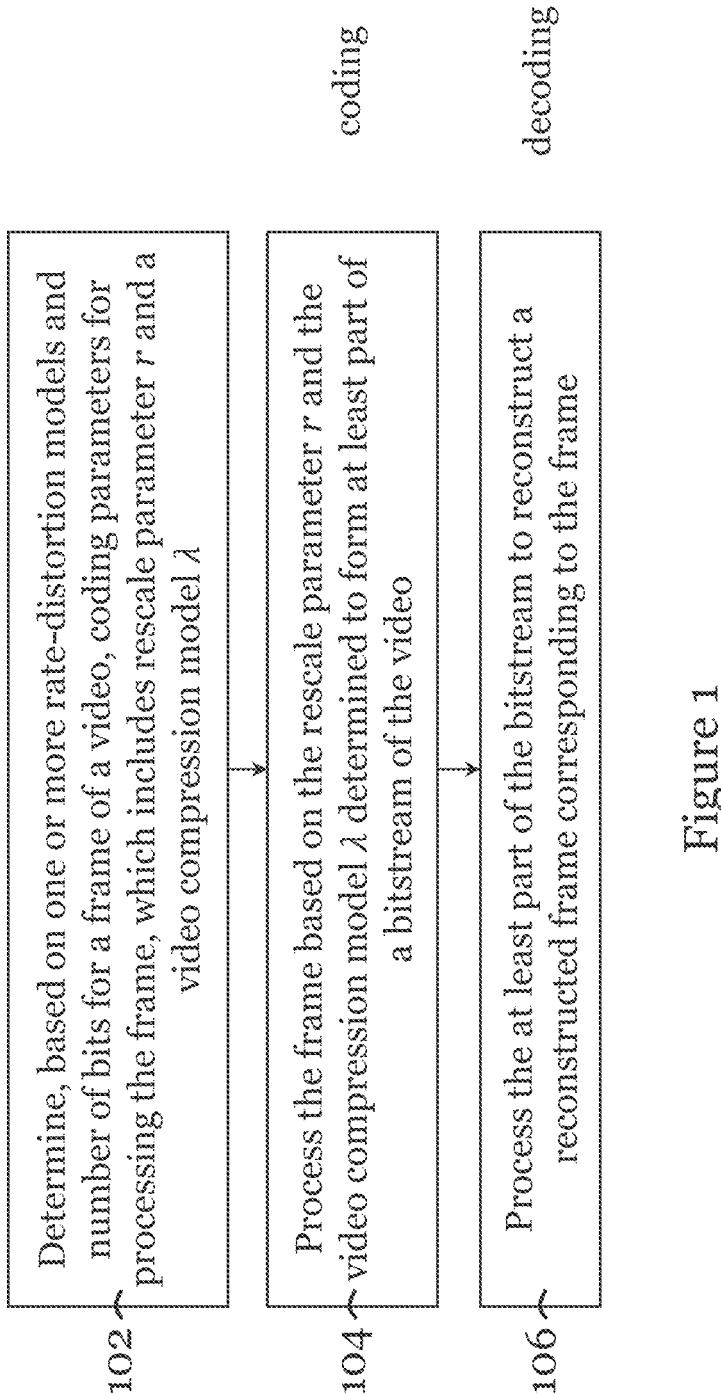
FIG. 1 is a flowchart illustrating a method for processing a video in some embodiments of the invention.

FIG. 1 shows a method 100 for processing a video, e.g., a video data file containing digital video data, in some embodiments of the invention. The method 100 in these embodiments is a computer-implemented method that can be performed using suitable software and/or hardware.

The method 100 includes, in step 102, determining, based on one or more rate-distortion models and number of bits for a frame of the video, coding parameters for processing the frame. The coding parameters may facilitate coding of the frame. In some embodiments, the coding parameters include, at least, a rescale parameter r and a video compression model (e.g., end-to-end video compression model) λ. The video compression model λ may generally correspond to a Lagrange multiplier. The rescale parameter r may be used for rescaling the frame. The video compression model λ may be used for encoding the frame (if no rescale required) or the rescaled frame. For example, the video compression model can be a DVC model trained on an end-to-end video coding framework with a specific Lagrange multiplier λ. An example of such DVC model is disclosed in Lu et al. "DVC: An end-to-end deep video compression framework" (2019), the entire contents of which is incorporated herein by reference.

In some embodiments, the rescale parameter r is a rescale value or ratio for affecting resolution of the frame to facilitate encoding of the frame. For example, the rescale value or ratio may be applied to downsample or upsample the frame. In some embodiments, the rescale parameter r is a rescale value or ratio for affecting resolution of the frame and/or a reference frame associated with the frame, e.g., such that the resolution of the frame and the resolution of the reference frame are substantially matched (i.e., the same), to facilitate encoding of the frame. The reference frame may be a frame of the video before (e.g., immediately before) the frame of the video. The frame and the reference frame may or may not be consecutive and/or continuous frames of the video.

In some embodiments, the one or more rate-distortion models may include a rate model $f_R$ and a distortion model $f_D$. In some embodiments, the rate model $f_R$ for each video compression model λ is respectively representable as a hyperbolic function of the rescale parameter r. In one example, the rate model $f_R$ is representable as $R=f_R(\lambda, r) = \alpha_1 \cdot r^{\beta_1}$ where R is coding rate, and $\alpha_1$ and $\beta_1$ are video content dependent parameters of video compression model λ. In some embodiments, the distortion model $f_D$ for each video compression model λ is respectively representable as a hyperbolic function of the rescale parameter r. In one example, the distortion model $f_D$ is representable as $D=f_D(\lambda, r) = \alpha_2 \cdot r^{\beta_2}$ where D is distortion measure, and $\alpha_2$ and $\beta_2$ are video content dependent parameters of video compression model λ.

Figure 2:
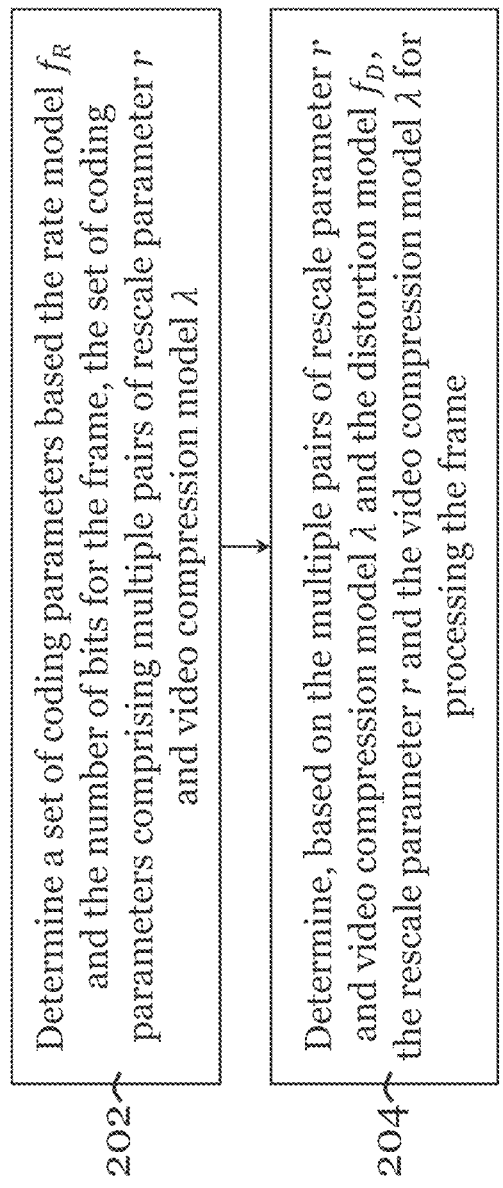
FIG. 2 is a flowchart illustrating a method for processing a video in some embodiments of the invention.

FIG. 2 shows a more detailed version of step 102 in FIG. 1 in some embodiments of the invention. The method 200 includes, in step 202, determining a set of coding parameters based the rate model $f_R$ and the number of bits for the frame. In some embodiments, the set of coding parameters includes multiple pairs of rescale parameter r and video compression model λ (i.e., multiple rescale parameters r and multiple video compression models λ). In some embodiments, each video compression model λ has a respective rescale parameter r. The method 200 also includes, in step 204, determining, based on the multiple pairs of rescale parameter r and video compression model λ as well as the distortion model $f_D$, the rescale parameter r and the video compression model λ for processing the frame. In some embodiments, step 204 includes determining, from the multiple pairs of rescale parameter r and video compression model λ, the rescale parameter r and the video compression model λ arranged to minimize distortion (distortion measure) based on the distortion model $f_D$.

Referring back to FIG. 1, the method 100 further includes, in step 104, processing the frame based on the rescale parameter r and the video compression model λ determined in step 102 or 204 to form at least part of a bitstream of the video. The processing in step 104 may include coding of the frame.

Figure 3:
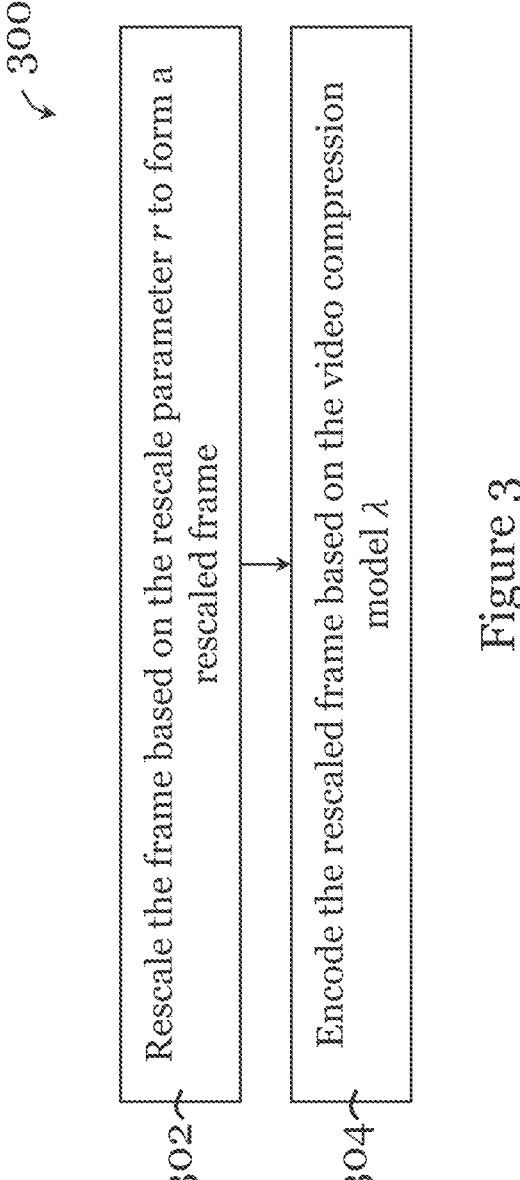
FIG. 3 is a flowchart illustrating a method for processing a video in some embodiments

FIG. 3 shows a more detailed version of step 104 in FIG. 1 in some embodiments of the invention. The method 300 includes, in step 302, rescaling the frame based on the rescale parameter r determined in step 102 or 204 to form a rescaled frame. The method 300 also includes, in step 304, encoding the rescaled frame based on the video compression model λ determined in step 102 or 204. In some embodiments, step 302 may be omitted (e.g., when the rescale factor equals to 1).

Referring back to FIG. 1, the method 100 further includes, in step 106, processing the at least part of the bitstream formed in step 104 to reconstruct a reconstructed frame corresponding to the frame. The processing in step 106 may include decoding of the frame.

Figure 4:
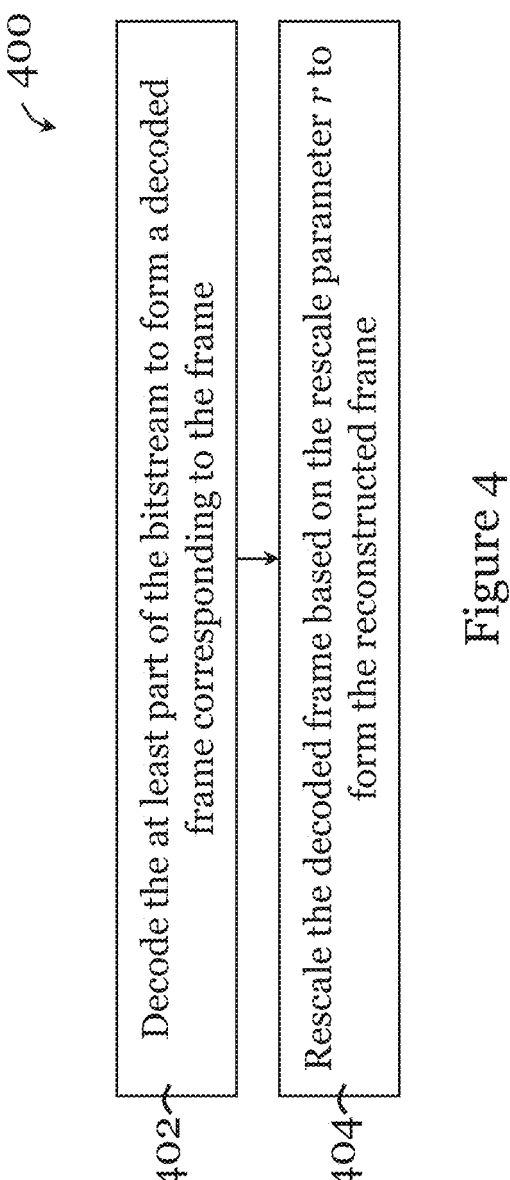
FIG. 4 is a flowchart illustrating a method for processing a video in some embodiments of the invention.

FIG. 4 shows a more detailed version of step 106 in FIG. 1 in some embodiments of the invention. The method 400 includes, in step 402, decoding the at least part of the bitstream to form a decoded frame corresponding to the frame. The method 400 also includes, in step 404, rescaling the decoded frame based on the rescale parameter r (determined for the frame in step 102, 204) to form the reconstructed frame. The reconstructed frame may have a resolution that is generally the same as a resolution of the frame. In some embodiments, step 404 may be omitted and the decoded frame corresponds to the reconstructed frame.

Although not illustrated in FIG. 1, in some embodiments, the method 100 includes, prior to step 102, determining the number of bits for the frame. The determining of the number of bits for the frame may include: determining number of bits for a group of picture structure of the video, and determining, based on the determined number of bits for the group of picture structure of the video, the number of bits for the frame. In some embodiments, the determining of the number of bits for the group of picture structure of the video is based on:

$$R_{GOP} = \frac{R_{PicAvg} \times (N_{coded} + \Phi) - R_{coded}}{\Phi} \times N_{GOP}$$

where $R_{GOP}$ denotes number of bits for the group of picture structure, $R_{PicAvg}$ denotes average bits per frame for the video, $R_{coded}$ represents number of bits already used for the video, $N_{coded}$ represents number of already encoded frames of the video, and $\Phi$ denotes size of a sliding window. In some embodiments, the determining of the number of bits for the frame is based on:

$$R_{Pic} = \frac{R_{GOP} - R_{cur\_GOP\_coded}}{\sum_{(uncoded\ frames)} \omega_{Pic}} \times \omega_{cur\_pic}$$

where $R_{Pic}$ denotes the number of bits for the frame, $R_{GOP}$ denotes number of bits for the group of picture structure, $R_{cur\_GOP\_coded}$ denotes number of bits already used for the group of picture structure, $\omega_{Pic}$ denotes weight(s) allocated to individual uncoded frame(s) of the video, and $\omega_{cur\_pic}$ denotes weight allocated to the frame.

Although not illustrated in FIG. 1, in some embodiments, the method 100 includes, prior to step 102, initializing the one or more rate-distortion models, which may include initializing the rate model $f_R$ and/or initializing the distortion model $f_D$. In some embodiments, the initializing of the rate model $f_R$ and/or the distortion model $f_D$ may include setting or assigning parameters (e.g., video content dependent parameters) of the rate model $f_R$ and/or the distortion model $f_D$, e.g., based on training or training results.

Although not illustrated in FIG. 1, in some embodiments, the method 100 includes, after step 104, updating the one or more rate-distortion models, which may include updating the rate model $f_R$ and/or updating the distortion model $f_D$, for processing one or more subsequent frames of the video (e.g., including a frame immediately after the frame that has just been processed).

In some embodiments, the updating of the rate model $f_R$ and/or the distortion model $f_D$ may include updating parameters (e.g., video content dependent parameters) of the rate model $f_R$ and/or the distortion model $f_D$, e.g., based on the processing in step 104 and/or step 106 applied to the frame. In one example, updating the rate model $f_R$ includes updating one or more parameters of the rate model $f_R$ based on an actual coding rate used for coding the frame and an estimated coding rate R determined based on the rescale parameter r, the video compression model $\lambda$, and the rate model $f_R$. In one example in which the rate model $f_R$ is representable as $R = f_R(\lambda, r) = \alpha_1 \cdot r^{\beta_1}$ where R is coding rate, and $\alpha_1$ and $\beta_1$ are video content dependent parameters of video compression model $\lambda$, the updating of the rate model $f_R$ may be based on:

$$\alpha_1^{new} = \alpha_1^{old} + \delta_\alpha (\ln R_{real} - \ln R_{est}) \times \alpha_1^{old}$$

$$\beta_1^{new} = \beta_1^{old} + \delta_\beta (\ln R_{real} - \ln R_{est}) \times \ln r$$

where $$\alpha_1^{old} \text{ and } \beta_1^{old}$$

are video content dependent parameters of the rate model $f_R$ before the update, $$\alpha_1^{new} \text{ and } \beta_1^{new}$$

are video content dependent parameters of the rate model $f_R$ after the update, $\delta_\alpha$ is a constant, $\delta_\beta$ is a constant, $R_{real}$ is the actual coding rate, and $R_{est}$ is the estimated coding rate. In one example, updating the distortion model $f_D$ includes updating one or more parameters of the distortion model $f_D$ based on an estimated distortion measure of the frame determined based on the distortion model $f_D$ and an actual distortion measure of the frame determined based on step 106. The actual distortion measure may be represented by an actual mean squared error (MSE) of the frame determined based on step 106 and the estimated distortion measure may be represented by an estimated mean squared error (MSE) determined based on the rescale parameter r, the video compression model $\lambda$, and the distortion model $f_D$. In one example in which the distortion model $f_D$ is representable as $D = f_D(\lambda, r) = \alpha_2 \cdot r^{\beta_2}$ where D is distortion measure, and $\alpha_2$ and $\beta_2$ are video content dependent parameters of video compression model $\lambda$, the updating of the distortion model $f_D$ may be based on:

$$\alpha_2^{new} = \alpha_2^{old} + \delta_\alpha (\ln D_{real} - \ln D_{est}) \times \alpha_2^{old}$$

$$\beta_2^{new} = \beta_2^{old} + \delta_\beta (\ln D_{real} - \ln D_{est}) \times \ln r$$

where $$\alpha_2^{old} \text{ and } \beta_2^{old}$$

are video content dependent parameters of the rate model before the update, $$\alpha_2^{new} \text{ and } \beta_2^{new}$$

are video content dependent parameters of the rate model after the update, $\delta_\alpha$ is a constant, $\delta_\beta$ is a constant, $D_{real}$ is the actual distortion measure, and $D_{est}$ is the estimated distortion measure.

The method 100 in FIG. 1 can be applied for processing one or more or all of the frames of the video. In some embodiments, step 102 is performed for each of the frames to be processed. In some embodiments, the one or more rate-distortion models are updated every time after step 104 and/or step 106 for a respective frame. In some embodiments, the rate model $f_R$ is updated every time after (not necessarily immediately after) step 104 for a respective frame. In some embodiments, the distortion model $f_D$ is updated every time after (not necessarily immediately after) step 106 for a respective frame. In some embodiments, the rate model $f_R$ is updated only after (not necessarily immediately after) step 104 for some (not all) of the frames. In some embodiments, the distortion model $f_D$ is updated only after (not necessarily immediately after) step 106 for some (not all) of the frames.

Figure 5:
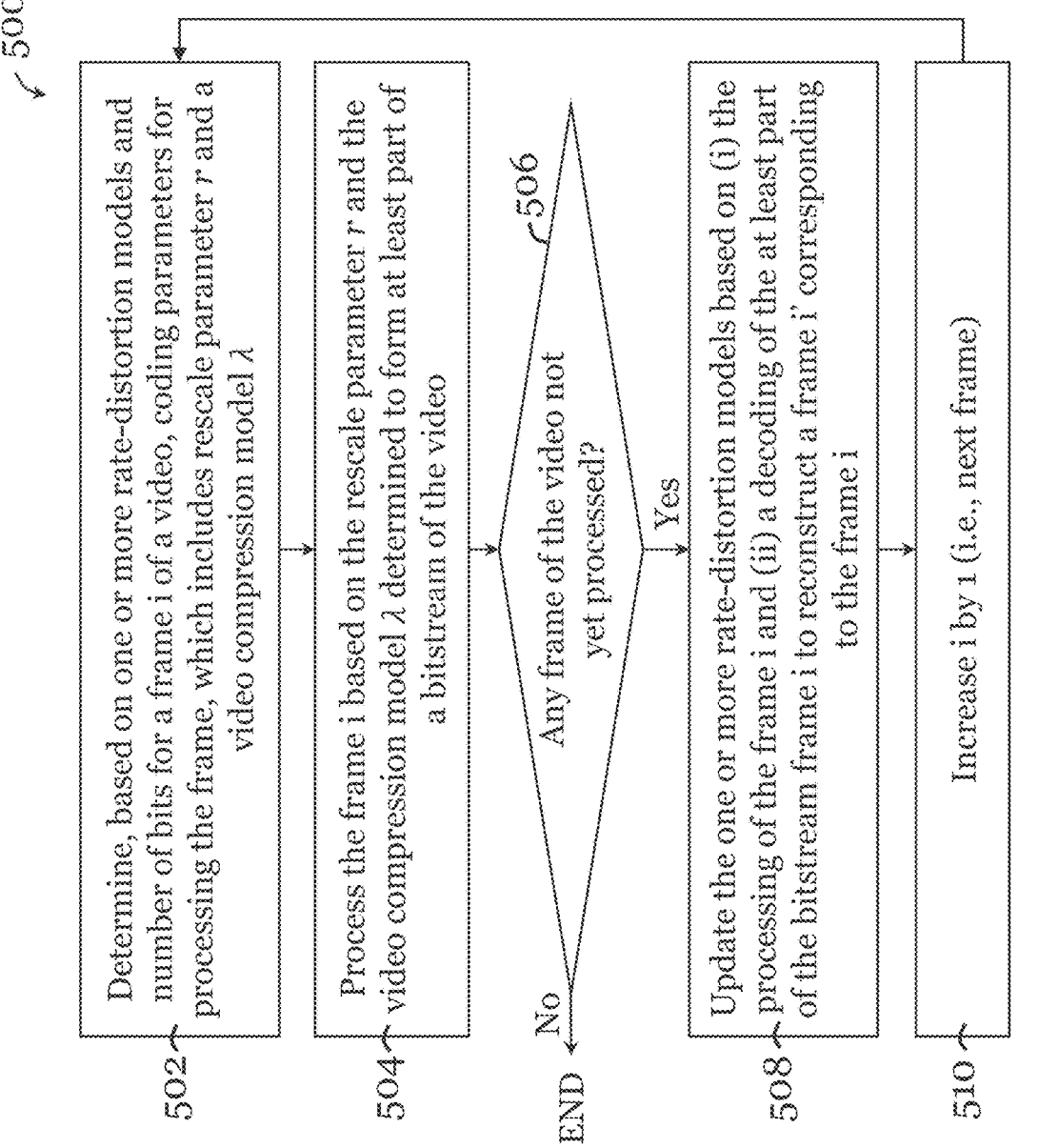
FIG. 5 is a flowchart illustrating a method for processing a video in some embodiments of the invention.

FIG. 5 shows a method 500 for processing a video, e.g., a video data file containing digital video data, in some embodiments of the invention. The method 500 can be considered as an example implementation of the method 100 without the decoding operation(s). It should be noted that the method 500 can be modified to include decoding operation(s) like step 106 in FIG. 1.

The method 500 includes, in step 502, determining, based on one or more rate-distortion models and number of bits for a frame i of a video, coding parameters for processing the frame (rescale parameter r and a video compression model $\lambda$). In this example, i=1, 2, . . . , N; and the video includes N frames in total. Step 502 generally corresponds to step 102 (i.e., features applicable to step 102 are also applicable to step 502) hence for brevity its details is not repeated here.

The method 500 also includes, in step 504, processing the frame i based on the rescale parameter r and the video compression model $\lambda$ determined to form at least part of a bitstream of the video. Step 504 generally corresponds to step 104 (i.e., features applicable to step 104 are also applicable to step 504) hence for brevity its details is not repeated here.

After step 504, the method 500 proceeds to step 506, to determine whether any frame of the video has not yet been processed (using step 504).

If it is determined that all of the frames of the video has been processed (using step 504), then the method 500 ends.

If it is determined that at least one of the frames of the video has not been processed (using step 504), then the method 500 proceeds to step 508 to update the one or more rate-distortion models based on the processing of the frame i and a decoding of the at least part of the bitstream frame i to reconstruct a frame i' corresponding to the frame i. Step 502 generally corresponds to the updating of the one or more rate-distortion models described above in relation to FIG. 1 hence for brevity its details is not repeated here.

After the update, in step 510, the method 500 moves on to the next frame (e.g., a following frame immediately after the frame that has just been processed by step 504), and returns to step 502 to apply method 500 for processing that next frame. The process in method 500 may repeat until all of the frames of the video has been processed.

Figure 6:
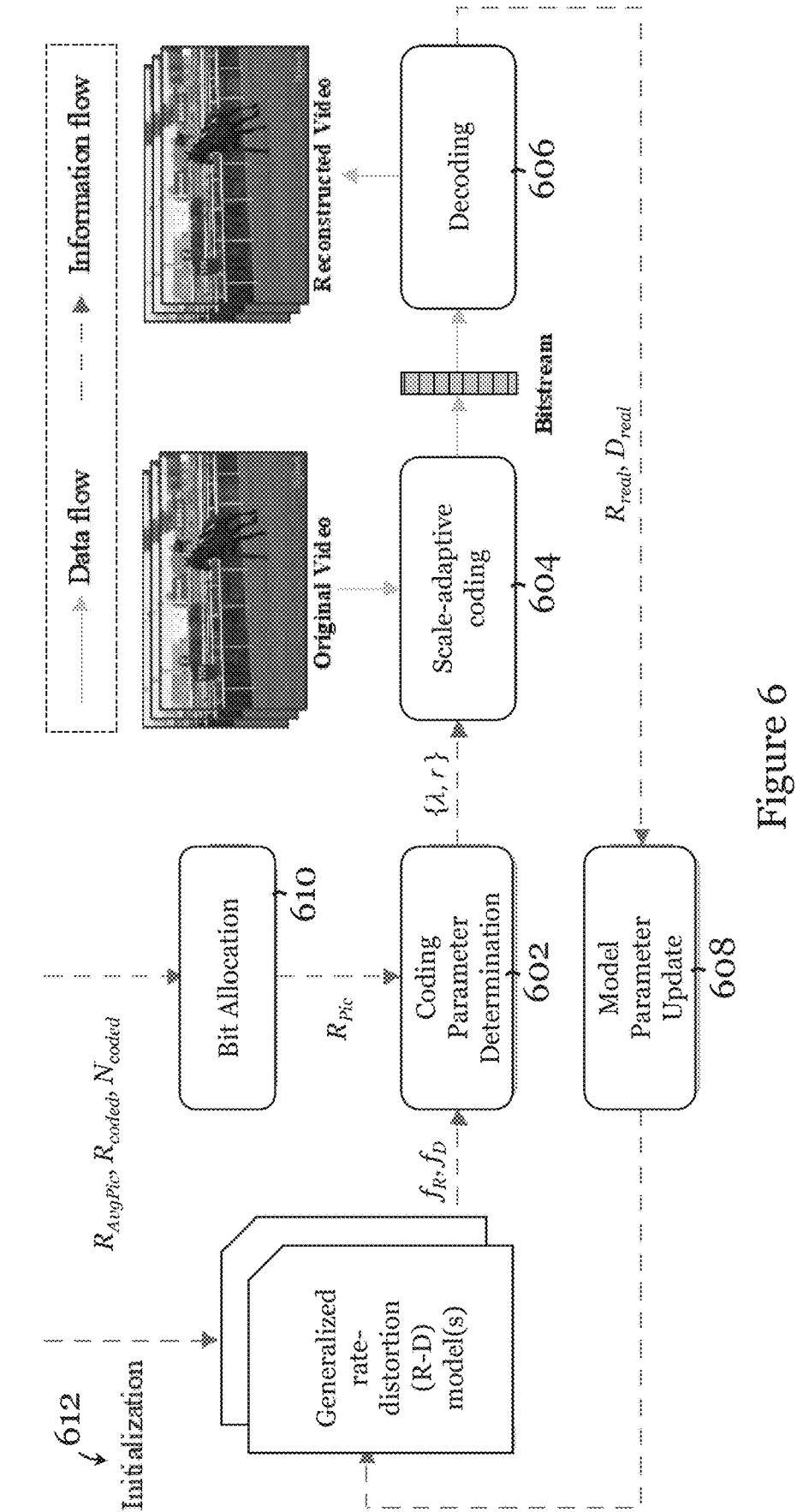
FIG. 6 is a schematic diagram illustrating a framework for processing a video (with a rate control algorithm for scale-adaptive end-to-end video coding) in one embodiment of the invention.

FIG. 6 shows a framework 600 for processing a video in one embodiment of the invention. The framework 600 in FIG. 6 can be considered as an example implementation of the method 100 of FIG. 1, with coding parameter determination 602 as an example of step 102, scale-adaptive coding as an example of step 104, decoding 606 as an example of step 106, etc.

As an overview, in this embodiment, the framework 600 includes a rate control algorithm for scale-adaptive end-to-end coding of video, which includes bit allocation 610 and coding parameter(s) determination 602, and uses generalized rate-distortion models. Unlike tradition rate-distortion models, which only depend on the video compression model, the generalized rate-distortion models characterize the relationship between rate-distortion and the generalized factors, i.e., frame resolution/rescale ratio, and video compression model. With the allocated bitrate, the rate control can be realized by: model initialization 612, coding parameter determination 602, and model updating (model parameter update 608). In this embodiment, the objective of coding parameter determination 602 is to find the optimal coding parameters such that the coded video sequence conforms to the target bitrate with minimal distortion. The video sequence is then encoded with the optimal coding parameters, in 604. The actual bitrate consumptions and distortions, determined based on 604 and 606, can be used to update the model parameters to adapt the generalized rate-distortion models. The coded bitstream can be decoded in 606 and rescaled to the original resolution. In this example, the rate control may relate to compressing the video frame(s), or the video, to conform the target bitrates.

A rate-distortion analysis for end-to-end scale adaptive video compression is now presented with reference to the framework 600 in FIG. 6.

In this embodiment, the scale-adaptive compression approach is useful in achieving accurate rate control and can address the problem of insufficient operational rate-distortion points due to limited availability of well-trained rate-distortion models. The relationships among bitrate, distortion, rescale ratio, and training models (Lagrangian multipliers) $\lambda$ are investigated. The generalized rate model and distortion model are developed to characterize the correlation between the rescale ratio and rate-distortion performance with respect to different $\lambda$. These models can be used in the subsequent rate control process.

One of the operations shown in the framework 600 of FIG. 6 is scale-adaptive coding 604. In this embodiment, a scale-adaptive end-to-end coding method for rate control is used to address the challenge that at least tens of models need to be trained to obtain denser coding bitrate points in end-to-end video coding analogous to controlling quantization parameters (QPs) in conventional video coding. In this embodiment, with scale-adaptive coding 604, the original video frame could be downsampled to an appropriate resolution and then encoded with end-to-end video coding framework such as DVC as disclosed in Lu et al., "DVC: An end-to-end deep video compression framework" (2019). For decoding 606, the reconstructed frame can be upsampled to the original resolution for display or future reference. In both encoding in 604 and decoding in 606, the reference frame, which may have a different resolution with the current to-be-encoded frame, can be re-sampled to the same resolution as the current to-be-encoded frame to facilitate prediction. In theory, it is feasible to downsample the frame to arbitrary low resolutions. The introduction of the rescaling operation can increase the number of rate operating points with limited amount of, or even without any, modifications or fine-tuning processes. Therefore, in this embodiment, the rescale ratio is introduced as an additional parameter. The coding parameters of spatial rescaling coding can be represented as the {$\lambda$, r} pair, where $\lambda$ specifies a compression model and r is the rescale ratio (e.g., for both width and height of the frame) for rescaling (e.g., downsampling) the current frame and the associated reference frame before encoding. The coding parameters can be determined and indicated frame-by-frame on-the-fly, and as a result successive frames of the video can be encoded with different resolutions.

The framework 600 in FIG. 6 also show rate-distortion models. In this embodiment, there exists multiple pairs of the coding parameters $\{\lambda, r\}$ to realize the target bits for a frame. The optimization goal is to select the optimal parameter set with the best reconstructed quality for the frame. A generalized rate-distortion model is established to analyze the rate-distortion characteristics and determine the optimal coding parameters for each frame in a single-pass coding process. The relationship among the coding rate R, rescale ratio r, model index $\lambda$, and distortion D of scale-adaptive end-to-end video coding are analyzed as follows.

In this embodiment, the generalized rate-distortion model includes a generalized rate (GR) model and a generalized distortion (GD) model, which can be represented as:

$$R = f_R(\lambda, r) \tag{1}$$

$$D = f_D(\lambda, r) \tag{2}$$

where R is the coding rate, D is the distortion measure, $f_R$ represents the function of the generalized rate model, and $f_D$ represents the function of the generalized distortion model.

To investigate how the rescaling may affect the rate-distortion performance, experiments are conducted using end-to-end video coding models with different $\lambda$ to encode video frames with frame-level resolution adaption. The results of the experiments indicate an approximately-hyperbolic correlation exists between r and R as well as between r and D. Therefore, the generalized rate model and the generalized distortion model can be formulated as the hyperbolic functions of rescale ratio r for each $\lambda=\lambda'$, where $\lambda'$ can be a trained (e.g., well-trained) video compression model used to perform scale-adaptive video coding. More specifically, the functions can be defined as:

$$R = f_R(\lambda, r) = f_{R|\lambda=\lambda'}(r) = \alpha_1 \cdot r^{\beta_1} \tag{3}$$

$$D = f_D(\lambda, r) f_{D|\lambda=\lambda'}(r) = \alpha_2 \cdot r^{\beta_2} \tag{4}$$

where $\alpha_1$, $\alpha_2$, $\beta_1$ and $\beta_2$ denote the content dependent model parameters, and different $\lambda$ values correspond to different end-to-end coding models. It should be noted that for different video sequences, the rescaling procedure may have different effects. Thus, the model parameters ($\alpha_1$, $\alpha_2$, $\beta_1$ and $\beta_2$) are updated on-line during encoding, to better adapt the change in the video content across different frames of the video.

Rate control for scale-adaptive end-to-end coding is now presented with reference to the framework 600 in FIG. 6. The scale-adaptive rate control scheme in this embodiment includes: bit allocation 610, coding parameters determination 602, and model adaptation (e.g., initialization 612 and parameters update 608).

In respect of bit allocation 610, in this embodiment, to allocate proper bitrates to each coding frame, an "equal distribution" strategy is used. Analogous to the traditional bit allocation scheme, such as the one disclosed in Li et al.

"$\lambda$-domain optimal bit allocation algorithm for High Efficiency Video Coding" (2016), the entire contents of which is incorporated herein by reference, the group of pictures (GOP) level bit allocation (with a sliding window) responsible for calculating the target number of bits for a GOP can be given by $$R_{GOP} = \frac{R_{PicAvg} \times (N_{coded} + \Phi) - R_{coded}}{\Phi} \times N_{GOP} \tag{5}$$

where $R_{PicAvg}$ denotes the average bits per frame for the entire video sequence, $R_{coded}$ represents the consumed bits, $N_{coded}$ represents the number of frames that have been already encoded, and $\Phi$ is the size of sliding window. In this example, $\Phi$ is set to 40. Subsequently, the frame level bit allocation further computes the number of bits for a frame:

$$R_{Pic} = \frac{R_{GOP} - R_{cur\_GOP\_coded}}{\sum_{\{uncoded\ frames\}} \omega_{Pic}} \times \omega_{cur\_pic} \tag{6}$$

where $\omega_{Pic}$ and $\omega_{cur\_pic}$ denote the weights allocated to an individual video frame. The remaining bits are assigned to the to-be-coded frames according to the associated weights. In particular, the video frames are coded in Low-Delay-P configuration and all the P frames share the same weights, such that the frame-level bit allocation is relevant to the remaining bit budgets and the number of to-be-coded frames.

In respect of coding parameters determination 602, according to the allocated bits for the frame, coding parameters $\{\lambda, r\}$ are determined for the frame, with the aim to achieve optimal rate-distortion performance. With the generalized rate model and the allocated bits $R_{Pic}$ of the current frame, the coding parameters closest to the given bits can be obtained. In this embodiment, the operation associated with coding parameters determination 602 searches for the operational rescale ratio r and $\lambda$ near the plane $R=R_{Pic}$ in the generalized rate model, which can be represented as:

$$P = \{(\lambda, r)|f_R(\lambda, r) \le (1+m)R_{Pic}, \lambda \in \Lambda, r \in \Omega\} \tag{7}$$

where $\Lambda$ and $\Omega$ denote the available $\lambda$ set and rescale ratio r set in scale-adaptive coding, and m is a margin value representing the tolerance of rate error. In this example, m is set to 10. Then, the optimal rescale ratio r and $\lambda$ is selected from P with respect to minimizing the distortion in the generalized distortion model. Then, the optimal rescale ratio r and $\lambda$, i.e., the associated parameters $\lambda_{opt}$, $r_{opt}$ are employed to encode the current frame. The derivation of $\lambda_{opt}$, $r_{opt}$ can be represented as:

$$(\lambda_{opt}, r_{opt}) = \arg\min_{(\lambda,r)\in P} f_D(\lambda, r) \tag{8}$$

It should be noted that in this embodiment there may exist numerous possible $(\lambda, r)$ combinations which satisfy the conditions in Equation (8). However, as the distortion monotonically decreases with the increase of r, it is not necessary to attempt all available $(\lambda, r)$ combinations. Instead, for each $\lambda$, the r candidate that could approach the target coding bits is considered.

In respect of model initialization 612 and update 608, in this embodiment, an initialization-then-updating strategy is applied. The strategy in this embodiment includes selecting proper values to initialize the model and updating the parameters on-line during the encoding process. This strategy can adapt the models to the video contents without the need for multi-pass coding. In this embodiment, at the beginning of the coding process, the initial model parameters $(\alpha,\beta)$ are set by averaging the fitting results of the generalized rate model and the generalized distortion model on a series of video sequences. In one example, the 5 sequences in HEVC Class B are involved for generating the initial model parameters. The initialization of model parameters provides useful clue for establishing efficient rate-distortion models. Given a frame with the associated allocated bits, the optimal coding parameters $\{\lambda, r\}$ determined by the rate-distortion model are used to encode the frame. Subsequently, the actual bit cost and distortion are used to update the model parameters. In this embodiment, only the parameters of $f_{R|\lambda}(r)$ and $f_{D|\lambda}(r)$ with $\lambda$ value corresponding to the coding parameter $\lambda$ are updated based on the disclosure in Li et al. "$\lambda$-domain optimal bit allocation algorithm for High Efficiency Video Coding" (2016):

$$\alpha_1^{new} = \alpha_1^{old} + \delta_a(\ln R_{real} - \ln R_{est}) \times \alpha_1^{old} \qquad (9)$$

$$\beta_1^{new} = \beta_1^{old} + \delta_B(\ln R_{real} - \ln R_{est}) \times \ln r$$

$$\alpha_2^{new} = \alpha_2^{old} + \delta_a(\ln D_{real} - \ln D_{est}) \times \alpha_2^{old} \qquad (10)$$

$$\beta_2^{new} = \beta_2^{old} + \delta_B(\ln D_{real} - \ln D_{est}) \times \ln r$$

Equation (9) can be used to update $\alpha_1$ and $\beta_1$ in the generalized rate model, where $R_{real}$ and $R_{est}$ respectively denote the actual rate and estimated rate calculated by $f_R$ $(\lambda,r)$. Equation (10) could be used to update $\alpha_2$ and $\beta_2$ in generalized distortion model, where $D_{real}t$ and $D_{est}$ respectively represent the actual mean squared error (MSE) and estimated mean squared error (MSE) calculated by $f_D(\lambda,r)$. In this example, $\delta_\alpha$ is set to 0.5 and $\delta_\beta$ is set to 0.1. The updated models (with updated parameters) can be used to decide the coding parameters for the next predicted (P) frame, and such process is repeated until the whole video sequence is encoded.

The rate control algorithm in this embodiment can be conducted with single-pass coding (with pre-coding analysis).

The framework 600 in this embodiment provides a high efficiency rate control for the end-to-end scale-adaptive video coding, enabling the conversion from the sparsely to densely distributed rate-distortion points. The framework 600 in this embodiment does not increase the number of models in the sparse-to-dense conversion, and provides more flexibility in end-to-end video coding, which lead to better coding performance.

Inventors of the present invention have devised, through their own research, that demands for video compression continue to exist due to the popularity of video acquisition devices. Also, video coding standards, e.g., high efficiency video coding (HEVC), audio and video coding standard (AVS), and versatile video coding (VVC), have been developed to improve the video compression efficiency. Inventors of the present invention have realized that in video coding, rate control plays an important role in real-application scenarios to regulate the output bitrate and to maintain a healthy buffer status, and generally speaking, the goal of rate control is to avoid overflow and underflow while optimizing the coding efficiency.

Inventors of the present invention have appreciated that rate control algorithms for video coding, such as the $\lambda$-domain rate control for HEVC and VVC, can improve the control of accuracy and rate-distortion (R-D) performance. Inventors of the present invention have appreciated that rate control can generally be divided into two stages: bit allocation and coding parameter derivation. Bit allocation aims to distribute the total bits to different coding levels (e.g., group-of-picture, frame and coding tree unit (CTU)), which aim to achieve a better R-D performance. Given the allocated bitrate, the optimal coding parameters are derived, such that the coded bits could approach the target bits as close as possible. The quantization parameter (QP) and Lagrangian multiplier $\lambda$ are two coding parameters that can be used in rate control in the conventional video coding framework.

Figure 7:
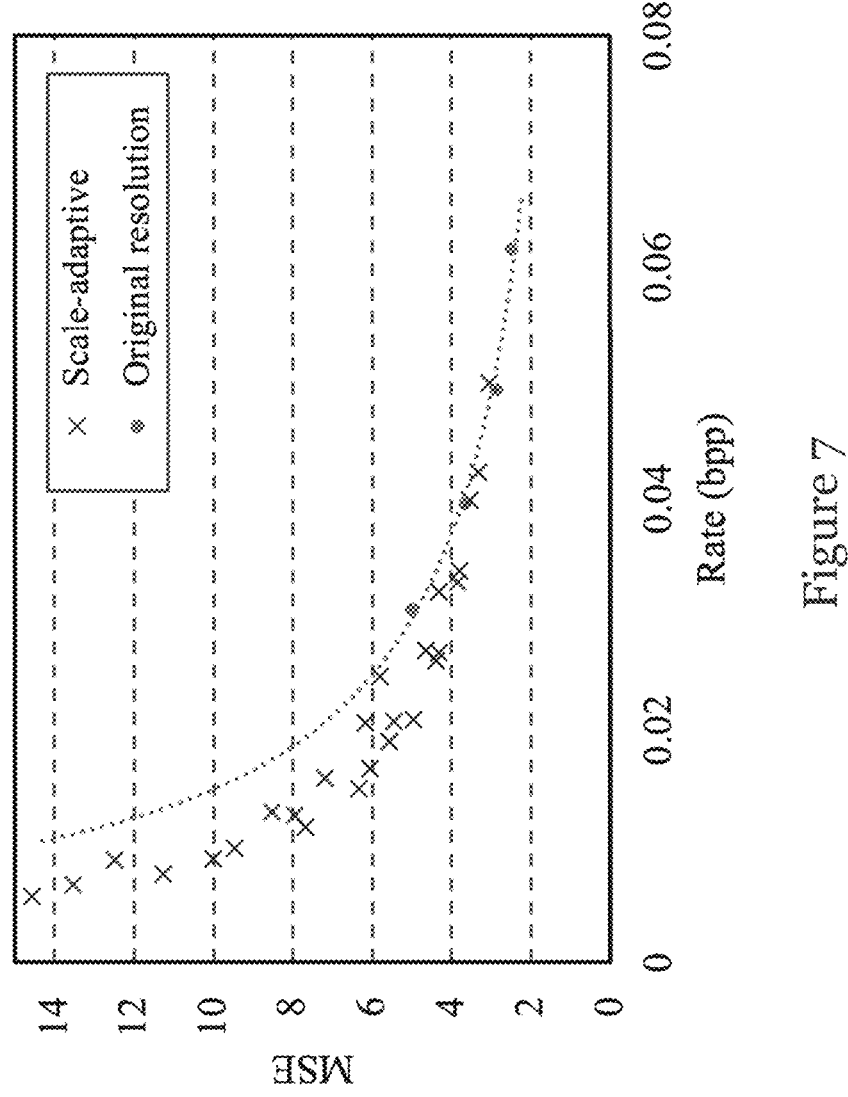
FIG. 7 is a graph showing operational rate-distortion (R-D) points of end-to-end video coding on BVI-HFR sequence "Typing" in one example.

Inventors of the present invention have found that the non-linear representation capability of the deep neural networks (DNNs) has benefited video compression. For example, Lu et al. "DVC: An end-to-end deep video compression framework" (2019) has proposed an end-to-end (E2E) deep video coding (DVC) framework with a series of DNN based modules for transformation, motion estimation and compensation, and reconstruction. The framework can be optimized in an end-to-end manner. Compared to traditional hybrid video coding framework, the pipeline of end-to-end video coding can be jointly optimized, which demonstrates promising compression efficiency. However, some existing end-to-end video coding schemes learn a model by minimizing the R-D cost with a specific Lagrange multiplier $\lambda$. In this case, problematically, the learned model can only compress a video with a certain bitrate, and multiple models may be required to achieve a wider range of coding bitrates with much denser distributions. Such one-to-one correspondence regarding the end-to-end model and coding bitrates hinders the wide-usage of end-to-end video compression, as in real-world application scenarios, only limited number of models may be allowed to distribute. As such, the R-D relationship of such an end-to-end video coding scheme may feature sparsely distributed R-D points. As an example, FIG. 7 shows operational R-D points of end-to-end video coding on the BVI-HFR sequence "Typing". In FIG. 7, the four solid points represent the R-D performance of four separate models with $\times=\{256, 512, 1024, 2048\}$ while the crosses denote the additional R-D points that can be attained by scale-adaptive coding. It can be seen that the sparsely distributed R-D points may cause problems to the rate control in end-to-end video coding.

To address these issues, the following embodiment of the invention provides a rate control scheme for scale-adaptive end-to-end video compression, which augments the sparse R-D points by resorting to adaptively changing the spatial resolution of coding frames. In this embodiment, analogous to the adaptive resolution coding in the hybrid framework of traditional video coding standards (e.g., the reference picture resampling in VVC), the spatial resolution of end-to-end video coding could be adjusted, where one flag per frame is used to indicate the variation of the resolution. In this embodiment, the optimal combination regarding the frame resolution and coding parameter $\lambda$ given the bitrate budget and coding status is adaptively determined to achieve rate control for scale-adaptive video coding. In this embodiment, at the decoder side, a bi-cubic upsampling is performed for recovering the frame to the original resolution. To this end, in this embodiment, the rescale ratio r is introduced as a controlling parameter that cooperates with the coding parameter $\lambda$ for frame-level resolution adjustment and rate adaption. The following disclosure also provides a generalized R-D model to characterize the relationship among $\lambda$, the rescale ratio r and the R-D performance. In particular, the generalized R-D model can be used to determine the coding parameters. A parameter updating strategy is applied to make the rate control to be more adaptive to the video content. Some example features of the following disclosure include:

High efficiency rate control for end-to-end scale-adaptive video coding, by determining the optimal scale and $\lambda$ given the bitrate budget. The sparsely distributed R-D points may be converted to the dense operational ones without introducing additional models, which leads to better rate control accuracy and R-D performance.

A systematic R-D analysis for the scale-adaptive end-to-end coding, and a generalized R-D model that characterizes the relationship among the coding parameters including $\lambda$, r and the R-D performance. The model lays a foundation for the rate control for scale-adaptive end-to-end coding.

A generalized R-D model for coding parameters determination that can achieve accurate rate control with promising R-D performance.

In video compression, rate-distortion optimization is important for improving R-D performance. The goal of the rate-distortion optimization is to select the optimal coding parameter set p to minimize the coding distortions under the constraint of the bitrate budget $R_t$. This process can be described as:

$$\min\{D\} \text{ subject to } R \le R_t \qquad (11)$$

Based on the disclosure in Sullivan et al., "Rate-distortion optimization for video compression" (1998), it can be further formulated as an unconstrained optimization problem on the R-D cost function with the Lagrange multiplier, $$\min\{J\} \text{ where } J = D + \lambda \cdot R \qquad (12)$$

where $\lambda$ is the Lagrange multiplier corresponding to the slope of the curve of the R-D cost function. Given the R-D relationship and the target bitrate of a video, the rate control can be achieved by finding the optimal operating points around the target bitrate. Therefore, the R-D modeling is important to the rate control.

Rate control algorithms for conventional video coding standards have been known. In recent years, there has been a tremendous growth of interest in learning based video coding (LVC) schemes. These methods show the promise that efficient compression performance can be achieved with the data-driven models.

To improve the R-D performance and coding efficiency, down-sampling before encoding and up-sampling after reconstruction can be performed in video coding.

This embodiment of the invention provides scale-adaptive end-to-end coding with rate control. In principle, there are advantages when introducing the scale-adaptive coding to end-to-end rate control. First, the scale adaptation provides greater flexibility in attaining the target bitrate, by augmenting the sparse R-D operating points. As such, better control accuracy can be obtained, making the rate control readily to be used in real-application scenarios. Second, with the optimal combination of encoding resolution and QP, better rate-distortion performance can be ensured. Therefore, this embodiment aims to provide a solution to high efficiency rate control for end-to-end scale-adaptive video coding.

The following disclosure presents the scale-adaptive compression approach in one embodiment, which plays a key role in achieving accurate rate control and addressing the problem of insufficient operational R-D points with limited well-trained models. Subsequently, the relationships among bitrate, distortion, rescale ratio and training Lagrangian multiplier $\lambda$ are investigated. In particular, the generalized rate model and distortion model are developed to characterize the correlation between the rescale ratio and R-D performance with respect to different $\lambda$s. These models can be used in the subsequent rate control process.

In terms of scale-adaptive coding, generally speaking, in existing LVC schemes such as the DVC as disclosed in Lu et al. "DVC: An end-to-end deep video compression framework" (2019), coding model is trained by minimizing the R-D cost function (i.e., $R+\lambda D$) with a designated $\lambda$, corresponding to the specific coding bitrate. To achieve multiple coding rates, multiple models are trained separately by optimizing objective functions with different $\lambda$s. As such, in order to achieve denser coding bitrate points analogous to controlling QPs in conventional video coding, at least tens of models should be trained beforehand with predefined $\lambda$s. Such a tedious process and gigantic model capacity may hinder the application of the LVC.

To address these challenges, one embodiment of the invention provides a scale-adaptive end-to-end coding approach for rate control. In particular, with the scale-adaptive coding, the original video frame could be downsampled to an appropriate resolution and then encoded with the DVC framework. At the decoder side, the reconstructed frame can be upsampled to the original resolution for display or future reference. In both encoding and decoding, the reference frame that may have a different resolution with the current to-be-encoded frame, can be resampled to the identical resolution to facilitate the prediction. In theory, it is feasible to downsample the frame to arbitrary low resolutions. The introduction of the rescaling operation is capable of increasing the number of rate operating points, with a limited number of separate models (e.g., four original models are involved in this embodiment, although other number of models are possible in other embodiments) without any modifications or fine-tuning processes. Therefore, the rescale ratio is introduced as an additional parameter. The coding parameters of spatial rescaling coding can be represented as the $\{\lambda, r\}$ pair, where $\lambda$ specifies a compression model and r is the rescale ratio (for both width and height) for downsampling the current frame and the associated reference frame before encoding. The coding parameters are determined and indicated frame-by-frame on-the-fly, indicating that the successive frames can be encoded with different resolutions.

The rescaling processes in this embodiment include downsampling and upsampling, which are conducted with bi-cubic interpolation, with the goal of demonstrating the effectiveness of the rate control with scale-adaptive coding scheme of this embodiment. It should be noted that replacing the bi-cubic method with more sophisticated deep neural networks can further improve the quality of reconstructed frames and thus boost the coding performance. However, this embodiment aims to incorporate scale-adaptive approach into the end-to-end coding to obtain improved performance and rate control flexibility.

The following disclosure investigates the relationship between the rescaling process and R-D performance with rescaling RD models. Subsequently, optimal coding parameters, i.e., the λ of an LVC model and corresponding rescale ratio r, can be determined through the rescaling R-D models.

In terms of the rate and distortion models, generally, there exists multiple pairs of the coding parameters {λ, r} to realize the target bits for a frame. The optimization goal is to select the optimal parameter set with the best reconstructed quality. To this end, one approach is to attempt all possible combinations of {λ, r} exhaustively and choose the optimal one with minimum distortion. However, such method consumes tremendous high computational resources and is very time consuming, hence is almost impractical for rate control in real-world applications. Therefore, determining the optimal coding parameters without multi-pass coding becomes the major challenge of the rate control with scale-adaptive coding. To tackle this challenge, a generalize RD model is established to analyze the R-D characteristics and determine the optimal coding parameters for each frame in a single pass coding process.

Figure 8B:
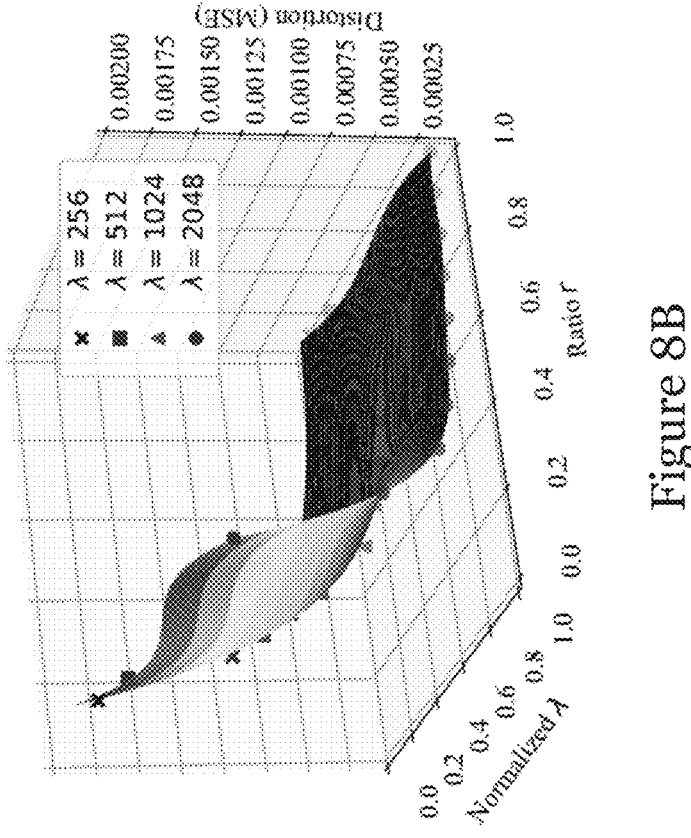
FIG. 8B is a plot illustrating relationship among video compression model (Lagrange multiplier) λ, rescale parameter r, and distortion for the sequence "Kimono1"
Figure 8A:
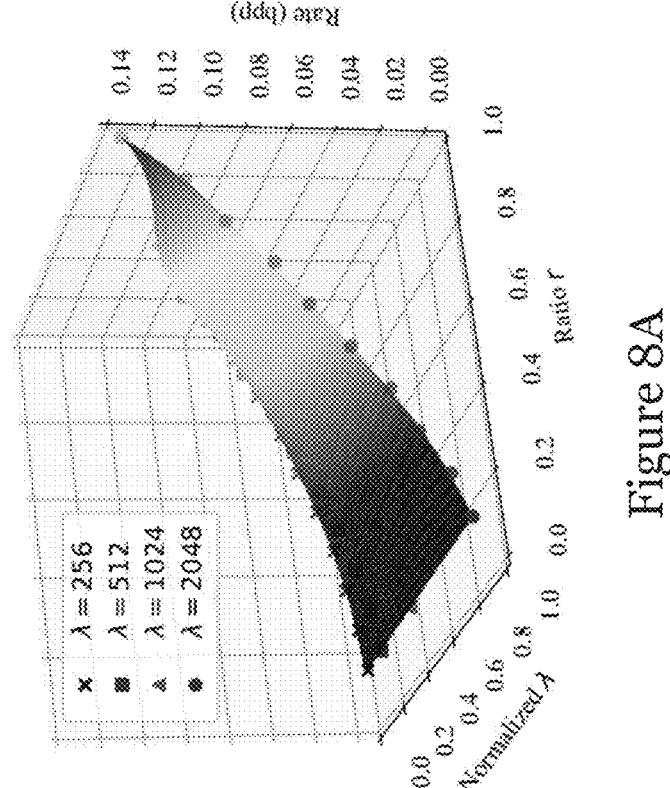
FIG. 8A is a plot illustrating relationship among video compression model (Lagrange multiplier) λ, rescale parameter r, and rate for the sequence "Kimono1"

FIGS. 8A and 8B illustrate the relationship among the rate, rescale ratio r, model indices λ and distortions of scale-adaptive end-to-end video coding for the sequence "Kimono1". In this embodiment, in particular, the generalized rate (GR) and generalized distortion (GD) models are given by:

$$R = f_R(\lambda, r) \tag{13}$$

$$D = f_D(\lambda, r) \tag{14}$$

where R and D are the coding rate and distortion, respectively. Moreover, $f_R$ and $f_D$ represent the functions of generalized rate and generalized distortion models, respectively.

To investigate the effect of rescaling on the R-D performance, experiments are conducted with the DVC coding models in Lu et al. In this example, different λs (i.e., 256, 512, 1024, 2048) are employed to encode video frames with frame-level resolution adaption. A variety of resolutions are involved, which are obtained by downsampling the frame with r values ranging from 0.1 to 1.0. The actual coded bitrate and distortions are collected and analyzed. In this example, the distortion is measured by computing the mean square error (MSE) between the original frame and the reconstructed frame aligning to the original resolution. It is worth mentioning that the pixels are scaled to [0, 1] when calculating the MSE. The bitrates are measured in terms of bit per pixel (bpp) after rescaling back to the original resolution. The generalized rate and generalized distortion models on corresponding 3D planes are shown in FIGS. 8A and 8B. These models are further projected to the 2D R-r and D-r planes, as shown in FIGS. 9A and 9B.

Figures 9A, 9B:
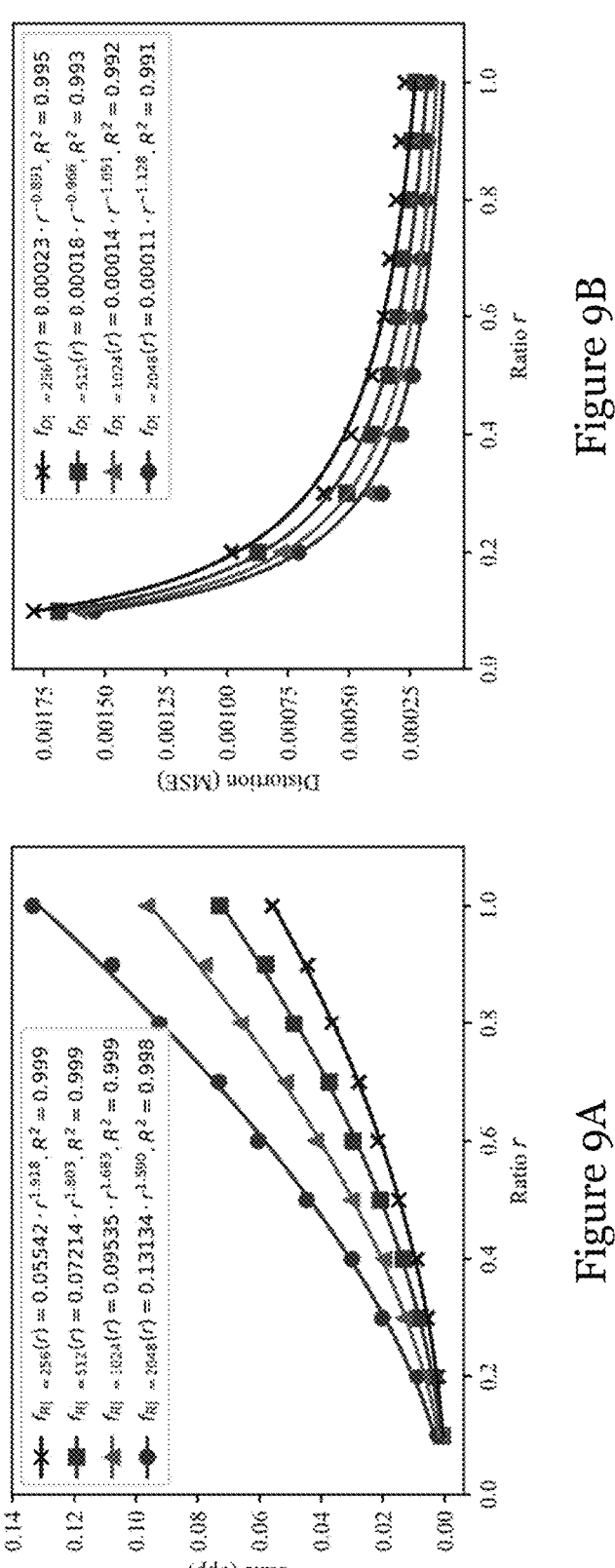
FIG. 9A is a graph illustrating the ratio-rate (R-r) relationship for each specific λ for the sequence "Kimono1"
FIG. 9B is a graph illustrating the distortion-rate (D-r) relationship for each specific λ for the sequence "Kimono1"

It can be observed from the fitted curves in FIGS. 9A and 9B that for the sample points with the same λ value, there is an approximate hyperbolic correlation between r and R, as well as r and D. Therefore, the generalized rate and generalized distortion models can be formulated as the hyperbolic functions of rescale ratio r for each λ=λ'. More specifically, the functions are defined as follows $$R = f_R(\lambda, r) = f_{R|\lambda=\lambda'}(r) = \alpha_1 \cdot r^{\beta_1} \tag{15}$$

$$D = f_D(\lambda, r) = f_{D|\lambda=\lambda'}(r) = \alpha_2 \cdot r^{\beta_2} \tag{16}$$

where $\alpha_1$, $\alpha_2$, $\beta_1$ and $\beta_2$ denote the content dependent model parameters, and different λ values correspond to different DVC coding models. It should be noted that for different video sequences, the rescale procedure may bring different influences. Therefore, the model parameters are updated online during the encoding, to better adapt the changing of the video content.

Figure 10:
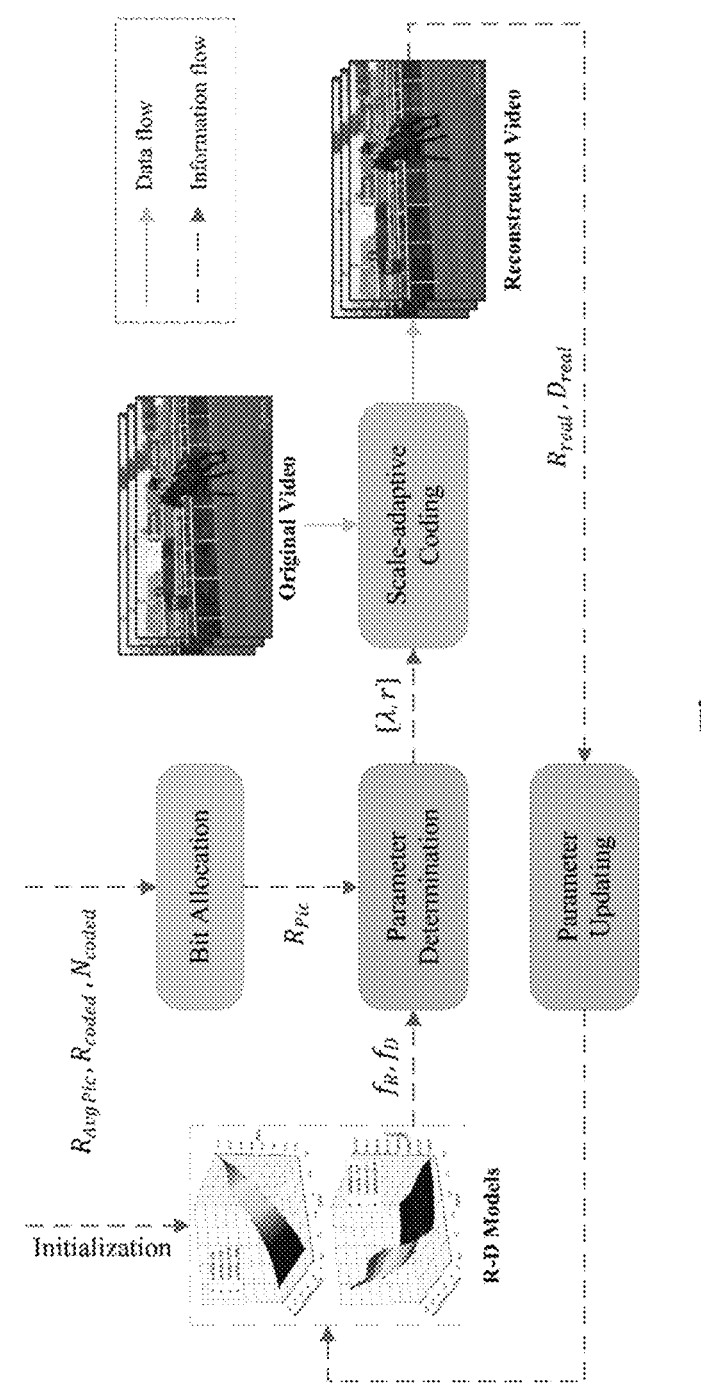
FIG. 10 is a schematic diagram of a framework for processing a video (with a rate control algorithm for scale-adaptive end-to-end video coding) in one embodiment of the invention.

FIG. 10 shows a framework 1000 of a rate control algorithm for scale-adaptive end-to-end coding in one embodiment of the invention. The framework generally includes bit allocation and coding parameter derivation. Given the allocated bitrate, the rate control is realized by the following three modules, including model initialization, coding parameter determination and model updating. Regarding the optimal coding parameters determination, the objective is to find the optimal coding parameters such that the coded sequence conforms to the target bitrate with the minimal distortion. The video sequence is then encoded with the optimal coding parameters. The actual bitrate consumptions and distortions are used to update the model parameters to adapt the rescaling R-D model. At the decoder side, the coded bitstream is decoded by the decoder and rescaled to the original resolution.

To allocate proper bitrates to each coding frame, an "equal distribution" strategy is adapted. Analogous to the traditional bit allocation scheme in Li et al., "a domain rate control algorithm for High Efficiency Video Coding" (2014), the GOP level bit allocation with a sliding window which is responsible for calculating the target number of bits for a GOP is given by $$R_{GOP} = \frac{R_{PicAvg} \times (N_{coded} + \Phi) - R_{coded}}{\Phi} \times N_{GOP} \tag{17}$$

where $R_{PicAvg}$ denotes the average bits per frame for the whole sequence. $R_{coded}$ and $N_{coded}$ represent the consumed bits and the number of frames that have been already encoded, respectively. $\Phi$ is the size of sliding window which is set to 40 in this example (other value is possible in other embodiments). Subsequently, the frame level bit allocation further computes the number of bits for a frame $$R_{Pic} = \frac{R_{GOP} - R_{cur\_GOP\_coded}}{\sum_{\{uncoded\ frames\}} \omega_{Pic}} \times \omega_{cur\_pic} \tag{18}$$

where $\omega_{Pic}$ and $\omega_{cur\_Pic}$ denote the weights allocated to individual frame. The remaining bits are assigned to the to-becoded frames according to the associated weights. In particular, the video frames are coded in Low-Delay-P configuration and all the P frames share the same weights, such that the frame-level bit allocation is relevant to the remaining bit budgets and the number of to-be-coded frames.

According to the allocated bits, coding parameters $\{\lambda, r\}$ are determined for the current frame, with the aim of achieving the optimal R-D performance. With the generalized rate model and the allocated bits $R_{Pic}$ of the current frame, it is feasible to obtain the coding parameters closest to the given bits. In practice, this embodiment searches for the operational rescale ratio r and $\lambda$ near the plane $R = R_{Pic}$ in the generalized rate model, which can be described as:

$$P = \{(\lambda, r) \mid f_R(\lambda, r) \le (1 + m)R_{Pic}, \lambda \in \Lambda, r \in \Omega\} \quad (19)$$

where $\Lambda$ and $\Omega$ denote the available $\lambda$ set and rescale ratio set in scale-adaptive coding. m is a margin value representing the tolerance of rate error, which is set to 10% in the experiments. Then, the optimal rescale ratio r and $\lambda$ are selected from P with respect to minimizing the distortion in the generalized distortion model, where the associated parameter $\lambda_{opt}, r_{opt}$ is employed to encode the current frame. The derivation of the $\lambda_{opt}, r_{opt}$ can be described as follows:

$$(\lambda_{opt}, r_{opt}) = \underset{(\lambda, r) \in P}{\arg\min} f_D(\lambda, r) \quad (20)$$

It is worth mentioning that there exist numerous possible $(\lambda, r)$ combinations satisfying the conditions in Equation (19). However, as the distortion is monotonically decreasing with the increase of r, it is not necessary to attempt all available $(\lambda, r)$ combinations. Instead, for each certain $\lambda$, the r candidate that could approach the target coding bits is considered.

The parameters $\alpha_1$, $\alpha_2$, $\beta_1$ and $\beta_2$ that describe the generalized rate and generalized distortion models in Equation (15) and Equation (16) are closely relevant to the characteristics of the video sequences. Though encoding the sequence by enumerating all the coding parameter combinations ($\lambda$ and r) provides the sufficient information for model parameter estimation, it is apparently not practical in real world applications. In the rate control, the coding parameters should be determined before encoding, which is typically regarded as the chicken-egg problem. It poses the unprecedented challenges in the scale-adaptive end-to-end coding, especially for the single-pass coding. A compromised solution is to pre-analyze the R-D characteristics of the first few frames to derive the RD models, which are used to determine the coding parameters for the whole video sequence. However, even enumerating the full coding parameter combinations with a single frame is computational complex, and such pre-analyzed scheme may also fail to handle the scene changing scenario. Therefore, an initialization-then-updating strategy is designed and applied in this embodiment, The initialization-then-updating strategy includes selecting proper values to initialize the model and updating the parameters on-line during the encoding process. Such strategy is eligible to adapt the models to video contents without the need for multi-pass coding.

At the beginning of the coding process, the initial model parameters are set as averaging the fitting results of generalized rate and generalized distortion models on a series of video sequences. Typically, the 5 sequences in HEVC Class B are involved for generating the initial model parameters. The initialization of model parameters provides useful clue for establishing efficient R-D models. Given a frame with the associated allocated bits, this embodiment uses the optimal coding parameters $\{\lambda, r\}$ determined by the R-D model to encode the frame. Subsequently, the actual bit cost and distortion are used to update the model parameters. More specifically, only the parameters of $f_{R|\lambda}(r)$ and $f_{D|\lambda}(r)$ with $\lambda$ value corresponding to the coding parameter $\lambda$ are updated based on the teaching of Li et al., "$\lambda$ domain rate control algorithm for High Efficiency Video Coding" (2014):

$$\alpha_1^{new} = \alpha_1^{old} + \delta_a(\ln R_{real} - \ln R_{est}) \times \alpha_1^{old} \quad (21)$$

$$\beta_1^{new} = \beta_1^{old} + \delta_B(\ln R_{real} - \ln R_{est}) \times \ln r$$

$$\alpha_2^{new} = \alpha_2^{old} + \delta_a(\ln D_{real} - \ln D_{est}) \times \alpha_2^{old} \quad (22)$$

$$\beta_2^{new} = \beta_2^{old} + \delta_B(\ln D_{real} - \ln D_{est}) \times \ln r$$

Equation (21) could be used to update $\alpha_1$ and $\beta_1$ in the generalized rate model, where $R_{real}$ and $R_{est}$ denote the actual rate and estimated rate calculated by $f_R(\lambda, r)$, respectively. Similarly, $\alpha_2$ and $\beta_2$ in generalized distortion model can be updated by Equation (22), where $D_{real}$ and $D_{est}$ represent the actual MSE and estimated MSE calculated by $f_D(\lambda, r)$, respectively. In the experiments, $\delta_\alpha$ is set to 0.5 and $\delta_\beta$ is set to 0.1. The updated models are used to decide the coding parameters for the next P frame, and such process is repeated until the whole sequence is encoded. It should be noted that the rate control algorithm in this embodiment can be conducted with single-pass coding with pre-analysis stage.

Experiments have been conducted to demonstrate the effectiveness of the rate control algorithm for scale-adaptive end-to-end video coding of this embodiment as illustrated in the framework 1000.

To investigate and model the generalized R-D characteristics of LVC, an experiment is performed with the HEVC Class B dataset consisting of five 1080P video sequences. For performance evaluation, the rate control algorithm of this embodiment is evaluated using the UVG dataset (as disclosed in Mercat et al. "UVG dataset: 50/120 fps 4K sequences for video codec analysis and development" (2020)), the BVI-HFR dataset (as disclosed in Mackin et al. "A study of high frame rate video formats" (2018)), and the BVI-Texture dataset (as disclosed in Papadopoulos et al. "A video texture database for perceptual compression and quality assessment" (2015)). In particular, the UVG dataset contains 7 test sequences. The BVI-HFR and BVI-Texture datasets include 22 and 20 video sequences respectively. The resolution of all sequences is 1920×1080. It should be mentioned that the test sequences are only used for testing (invisible during the R-D modeling process).

To evaluate the efficiency of the method of this embodiment, the rate-distortion performance is measured wherein the distortion is evaluated with the Peak signal-to-noise ratio (PSNR) and multi-scale structural similarity index for motion detection (MS-SSIM) based on the disclosure of Wang et al. "Multiscale structural similarity for image quality assessment" (2003). Moreover, rate error is calculated to evaluate the control accuracy of the method of this embodiment. The rate error can be calculated as follows, $$\delta R = \frac{|R_{real} - R_{tar}|}{R_{tar}} \times 100\% \quad (13)$$

where $R_{real}$ and $R_{tar}$ denote the actual rate and target rate, respectively.

To demonstrate the effectiveness of the rate control algorithm, scale-adaptive coding and rate control are applied on top of the DVC framework in Lu et al., which provides four separate compression models corresponding to different coding rates. The associated λs of DVC models are in Λ={256, 512, 1024, 2048}. Subsequently, the target bitrates are generated through five DVC models with fixed resolution compression, and the associated λs are in Ψ={64,128, 256,512,768}. Furthermore, the compression with Ψ set of the DVC models served as the anchor for comparison.

As the coding parameters {λ, r} are introduced during scale-adaptive coding process, the coding parameters are signaled into the bitstream as side-information such that the decoder could properly parse the associated information and reconstruct the video frame. In the experiments, four DVC models and ten optional rescale ratios are used to achieve scale-adaptive coding. Therefore, 2 bits are used to represent the indices of DVC models and 4 bits are used to represent the indices of rescale ratios. As such, total 6 bits are additionally signaled for each P-frame.

The overall coding performance, in terms of PSNR and MS-SSIM, are provided in Table I, where the rate control accuracy is also provided in the last column. It is found that the rate control algorithm of this embodiment can achieve low rate error (0.63% on average) for all target bitrates on test video datasets. In particular, when targeting the bitrate with anchor λ=768, the rate error is no more than 0.1% on all test datasets. These results demonstrate that the algorithms of this embodiment can achieve accurate rate control.

From Table I, it can be seen that for BVI-HFR and BVI-Texture test sets, the PSNR of the scale-adaptive rate control algorithm of this embodiment ("Propsoed") outperforms the DVC ("Anchor"). More specifically, with the UVG test set, the method of this embodiment achieves better PSNR in lower bitrates and brings competitive performance in higher bitrates, when compared with the DVC anchor. Regarding the MS-SSBM quality measure, the method of this embodiment outperforms the DVC anchor for both high and low bitrates.

12.04% and 11.61% for MS-SSIM, respectively. This demonstrates that the method of this embodiment brings better R-D performance than the DVC where the average bitrate savings are 8.8% and 12.98% in PSNR and MS-SSIM quality measures on average.

TABLE II

Average bitrate error and bd-rate of rate control algorithm of one embodiment of the invention on three video datasets

| | Embodiment of the invention ("Proposed") | | |
|---|---|---|---|
| Dataset | Average Bitrate Error | BD-rate (PSNR) | BD-rate (MS-SSIM) |
| BVI-HFR | 0.42% | −13.94% | −15.28% |
| UVG | 0.43% | −5.58% | −12.04% |
| BVI-Texture | 1.03% | −6.87% | −11.61% |
| Average | 0.63% | −8.80% | −12.98% |

Figures 11A, 11B, 11C:
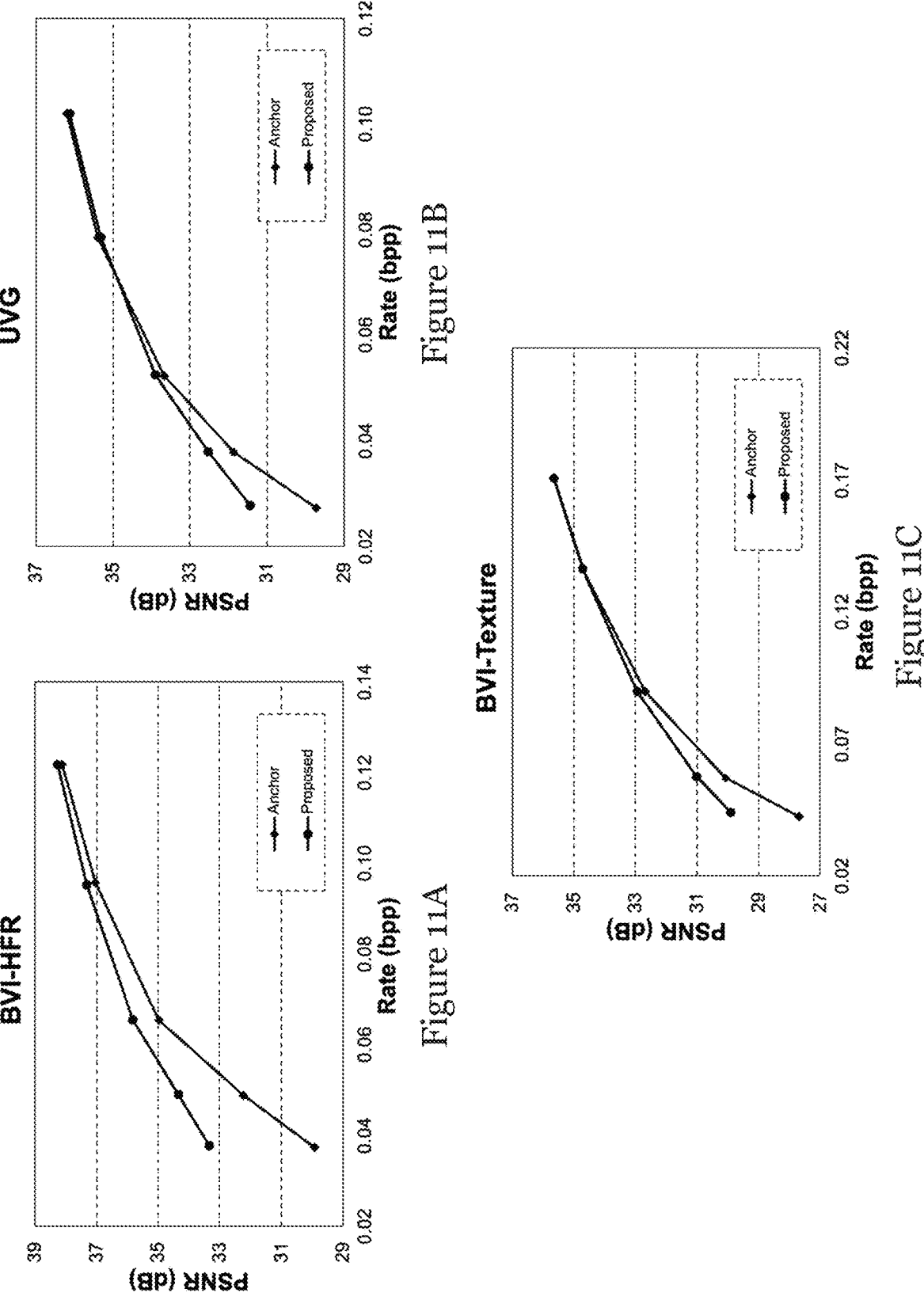
FIG. 11A is a graph showing coding performance (peak signal to noise ratio (PSNR) (dB) vs rate (bpp)) of the method in one embodiment of the invention ("Proposed", scale-adaptive rate control) and the reference DVC method ("Anchor") on processing the BVI-HFP video test set.
FIG. 11B is a graph showing coding performance (peak signal to noise ratio (PSNR) (dB) vs rate (bpp)) of the method in one embodiment of the invention ("Proposed", scale-adaptive rate control) and the reference DVC method ("Anchor") on processing the UVG video test set.
FIG. 11C is a graph showing coding performance (peak signal to noise ratio (PSNR) (dB) vs rate (bpp)) of the method in one embodiment of the invention ("Proposed", scale-adaptive rate control) and the reference DVC method ("Anchor") on processing the BVI-Texture video test set.
Figures 11D, 11E, 11F:
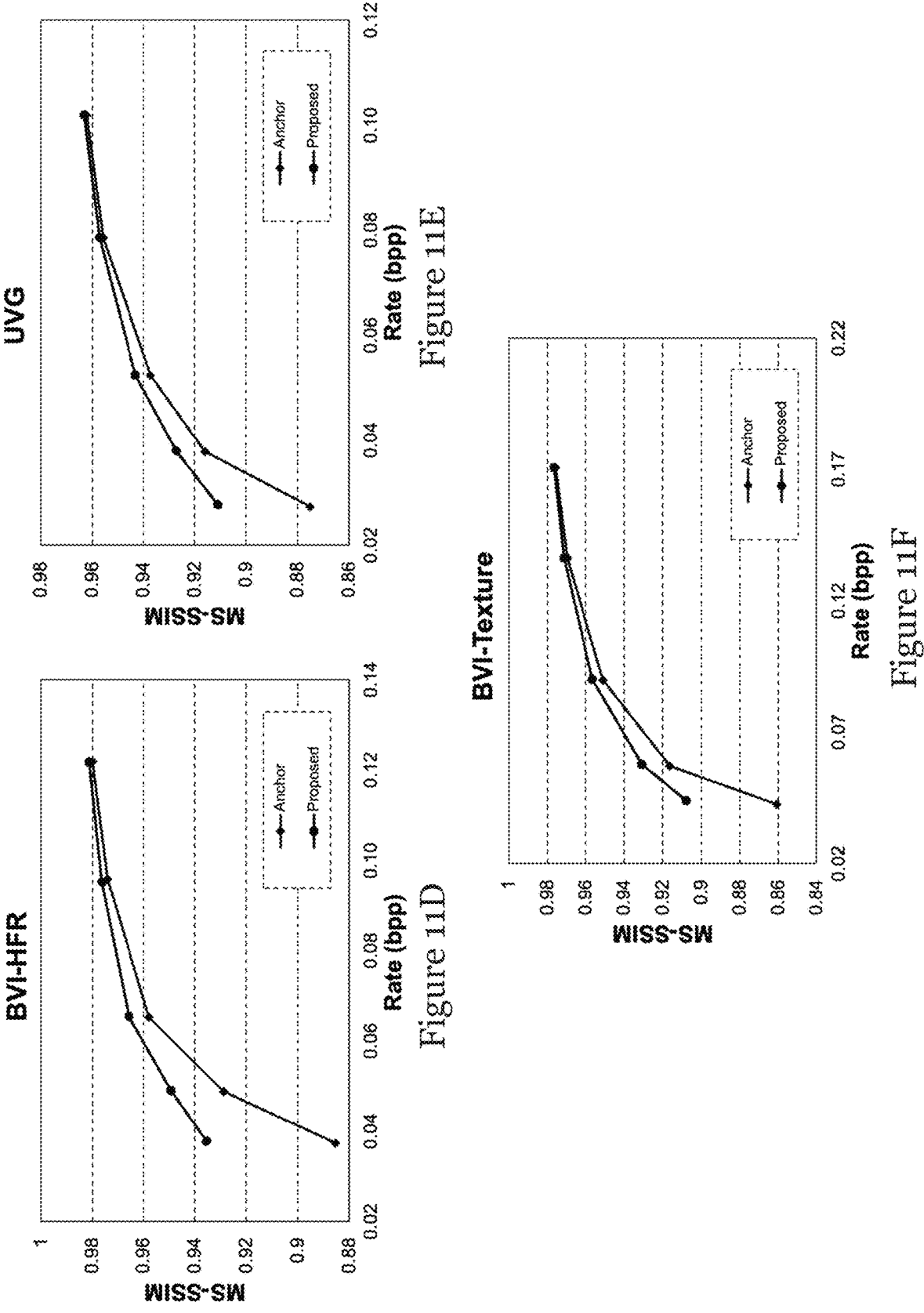
FIG. 11D is a graph showing coding performance (multi-scale structural similarity index for motion detection (MS-SSIM) vs rate (bpp)) of the method in one embodiment of the invention ("Proposed", scale-adaptive rate control) and the reference DVC method ("Anchor") on processing the BVI-HFP video test set.
FIG. 11E is a graph showing coding performance multi-scale structural similarity index for motion detection (MS-SSIM) vs rate (bpp)) of the method in one embodiment of the invention ("Proposed", scale-adaptive rate control) and the reference DVC method ("Anchor") on processing the UVG video test set.
FIG. 11F is a graph showing coding performance (multi-scale structural similarity index for motion detection (MS-SSIM) vs rate (bpp)) of the method in one embodiment of the invention ("Proposed", scale-adaptive rate control) and the reference DVC method ("Anchor") on processing the BVI-Texture video test set.

The R-D performance on the three video test sets are shown in FIGS. 11A to 11F. Specifically FIGS. 11A to 11C show the R-D performance (in terms of PSNR) of the method of this embodiment and the DVC anchor whereas FIGS. 11D to 11F show the R-D performance (in terms of MS-SSIM) of the method of this embodiment and the DVC anchor. It can be seen that in low bitrate coding scenarios, the method of this embodiment can improve the coding performance in terms of PSNR and MS-SSIM with a large margin compared with the anchors. In high bitrate coding scenarios, the method of this embodiment could achieve competitive performance in comparison to the DVC scheme in Lu et al.

To verify the effectiveness of the scale-adaptive coding in rate control algorithm of this embodiment, the rate control algorithm of this embodiment is compared with a multi-pass rate control scheme without scale-adaptive coding. In particular, the multi-pass coding scheme employs the same bit allocation strategy and each frame is coded multiple passes with all the DVC models in set Λ. All video frames are compressed in original resolution. Multiple coding results are obtained for each frame through the multi-pass coding

TABLE I

Overall coding performance of the rate control algorithm of one embodiment of the invention (bitrate in kbps, PSNR in db)

| Dataset | λ | DVS ("Anchor") (λ ∈ Λ) | | | Embodiment of the invention ("Proposed") (λ = Λ) | | | |
|---|---|---|---|---|---|---|---|---|
| | | Target Bitrate | PSNR | MS-SSIM | Bitrate | PSNR | MS-SSIM | Bitrate Error |
| BVI-HFR | 64 | 2200.58 | 29.92 | 0.8854 | 2218.44 | 33.34 | 0.9355 | 0.97% |
| | 128 | 2880.49 | 32.24 | 0.9287 | 2889.23 | 34.34 | 0.9493 | 0.27% |
| | 256 | 3849.67 | 34.97 | 0.9580 | 3856.81 | 35.81 | 0.9657 | 0.16% |
| | 512 | 5651.85 | 37.05 | 0.9741 | 5615.55 | 37.32 | 0.9763 | 0.63% |
| | 768 | 7184.59 | 38.12 | 0.9800 | 7117.46 | 38.26 | 0.9813 | 0.10% |
| UVG | 64 | 6434.14 | 29.72 | 0.8751 | 6552.75 | 31.43 | 0.9110 | 1.48% |
| | 128 | 8918.14 | 31.86 | 0.9161 | 8945.75 | 32.52 | 0.9271 | 0.39% |
| | 256 | 12332.38 | 33.67 | 0.9371 | 12363.36 | 33.89 | 0.9431 | 0.17% |
| | 512 | 18496.88 | 35.40 | 0.9556 | 18534.60 | 35.32 | 0.9571 | 0.09% |
| | 768 | 24037.86 | 36.19 | 0.9621 | 24058.73 | 36.13 | 0.9631 | 0.04% |
| BVI-Texture | 64 | 4995.81 | 27.70 | 0.8608 | 5150.08 | 29.91 | 0.9078 | 3.68% |
| | 128 | 6726.94 | 30.07 | 0.9163 | 6768.55 | 31.01 | 0.9309 | 1.06% |
| | 256 | 10576.13 | 32.68 | 0.9510 | 10600.64 | 32.94 | 0.9566 | 0.23% |
| | 512 | 16049.70 | 34.71 | 0.9696 | 16077.75 | 34.72 | 0.9713 | 0.08% |
| | 768 | 20137.77 | 35.64 | 0.9758 | 20134.56 | 35.65 | 0.9765 | 0.09% |

As shown in Table II, the BD-rate savings on the three test sets are 13.94%, 5.58% and 6.87% for PSNR, and 15.28%, process. Then, the corresponding DVC model with respect to the allocated bitrates that could achieve the best compression quality is selected to encode the current frame. For full resolution rate control, it is practically impossible to achieve lower bitrate (than anchor $\lambda<256$), and it is identical to the anchor when $\lambda=256$ and $\lambda=512$. Therefore, the coding performance of the two methods are compared in the unseen bitrate when $\lambda=768$, and the results are provided in Table III.

TABLE III

| | | Anchor | Proposed Rate Control (Embodiment of the invention) | | | | Full Resolution Rate Control | | | |
|---|---|---|---|---|---|---|---|---|---|---|
| | | Target | | | | | | | | |
| Dataset | λ | Bitrate (kbps) | Bitrate (kbps) | Bitrate Error | PSNR (dB) | MS-SSIM | Bitrate (kbps) | Bitrate Error | PSNR (dB) | MS-SSIM |
| BVI-HFR | 768 | 7184.59 | 7177.52 | 0.10% | 38.26 | 0.9813 | 7161.59 | 0.32% | 38.03 | 0.9797 |
| UVG | 768 | 24037.86 | 24048.62 | 0.04% | 36.13 | 0.9631 | 23974.03 | 0.27% | 36.05 | 0.9620 |
| BVI-Texture | 768 | 20137.77 | 20119.81 | 0.09% | 35.65 | 0.9765 | 20078.31 | 0.30% | 35.64 | 0.9756 |
| Average | | 17120.07 | 17115.31 | 0.08% | 36.68 | 0.9736 | 17071.31 | 0.29% | 36.57 | 0.9724 |

It has been found that the coding performance of the scale-adaptive rate control outperforms the one without scale-adaptive coding in terms of PSNR and MS-SSIM on all tested video datasets. This demonstrates the effectiveness of scale-adaptive coding for LVC rate control.

FIGS. 12A to 12C show the comparison of bitrate fluctuation per frame between the aforementioned multi-pass coding based rate control scheme and the rate control method of this embodiment on three example video sequences "Lamppost", "Water_ripples", and "CalmingWater". More specifically FIGS. 12A to 12C show the frame level bit cost (in terms of bpp) of scale-adaptive rate control and full resolution rate control on the three example video sequences. The target bitrates of each sequence are 20089 kbps, 10298 kbps and 40839 kbps from FIGS. 12A to 12C, respectively. In FIGS. 12A to 12C, only the bit cost of P-frames are shown. The bitrates of I-frame are excluded and only the bitrates of P-frames are shown for better visualization. The target bitrates are determined by DVC with λ value equals to 768. It can be seen that for the rate control algorithm of this embodiment (in solid lines), after the rescaling R-D model being adapted to the video content, the bitrate fluctuations among different P-frames are much smoother. Regarding the multi-pass rate control scheme (in dashed lines), the bitrate fluctuates with a wide range. This indicates that the scale-adaptive rate control algorithm of this embodiment can achieve the smoothness of bitrate variation thus improving the stability of encoding and decoding processes.

Figures 13A, 13B, 13C:
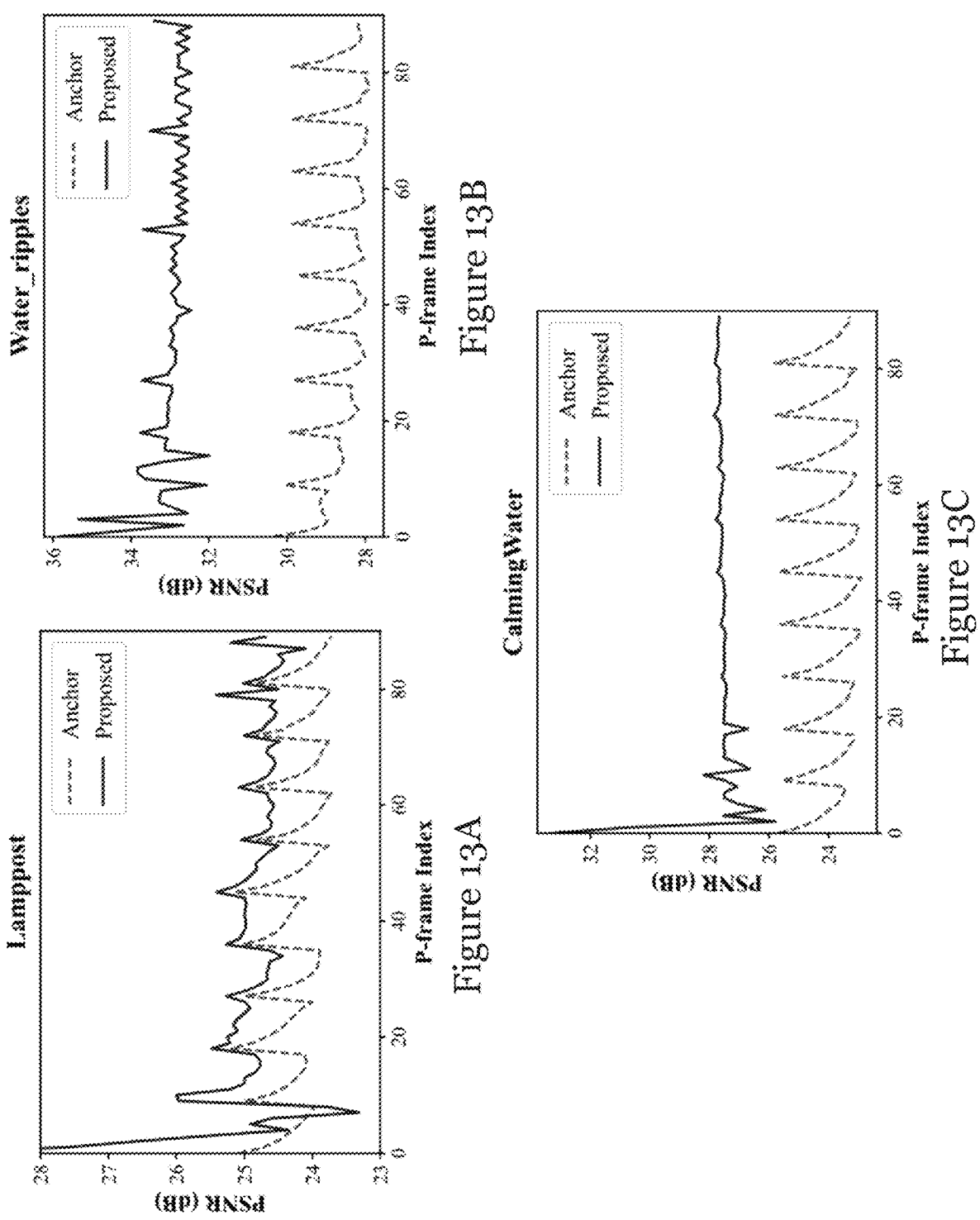
FIG. 13A is a graph showing quality fluctuation (peak signal to noise ratio (PSNR) (dB) vs rate (bpp)) of the method in one embodiment of the invention ("Proposed", scale-adaptive rate control) and the reference DVC method ("Anchor", λ=64) on processing the video sequence "Lamppost" (target bitrate=3775 kbps)
FIG. 13B is a graph showing quality fluctuation (peak signal to noise ratio (PSNR) (dB) vs rate (bpp)) of the method in one embodiment of the invention ("Proposed", scale-adaptive rate control) and the reference DVC method ("Anchor", λ=64) on processing the video sequence "Water_ripples" (target bitrate=3002 kbps)
FIG. 13C is a graph showing quality fluctuation (peak signal to noise ratio (PSNR) (dB) vs rate (bpp)) of the method in one embodiment of the invention ("Proposed", scale-adaptive rate control) and the reference DVC method ("Anchor", λ=64) on processing the video sequence "CalmingWater" (target bitrate=8281 kbps)
Figures 13D, 13E, 13F:
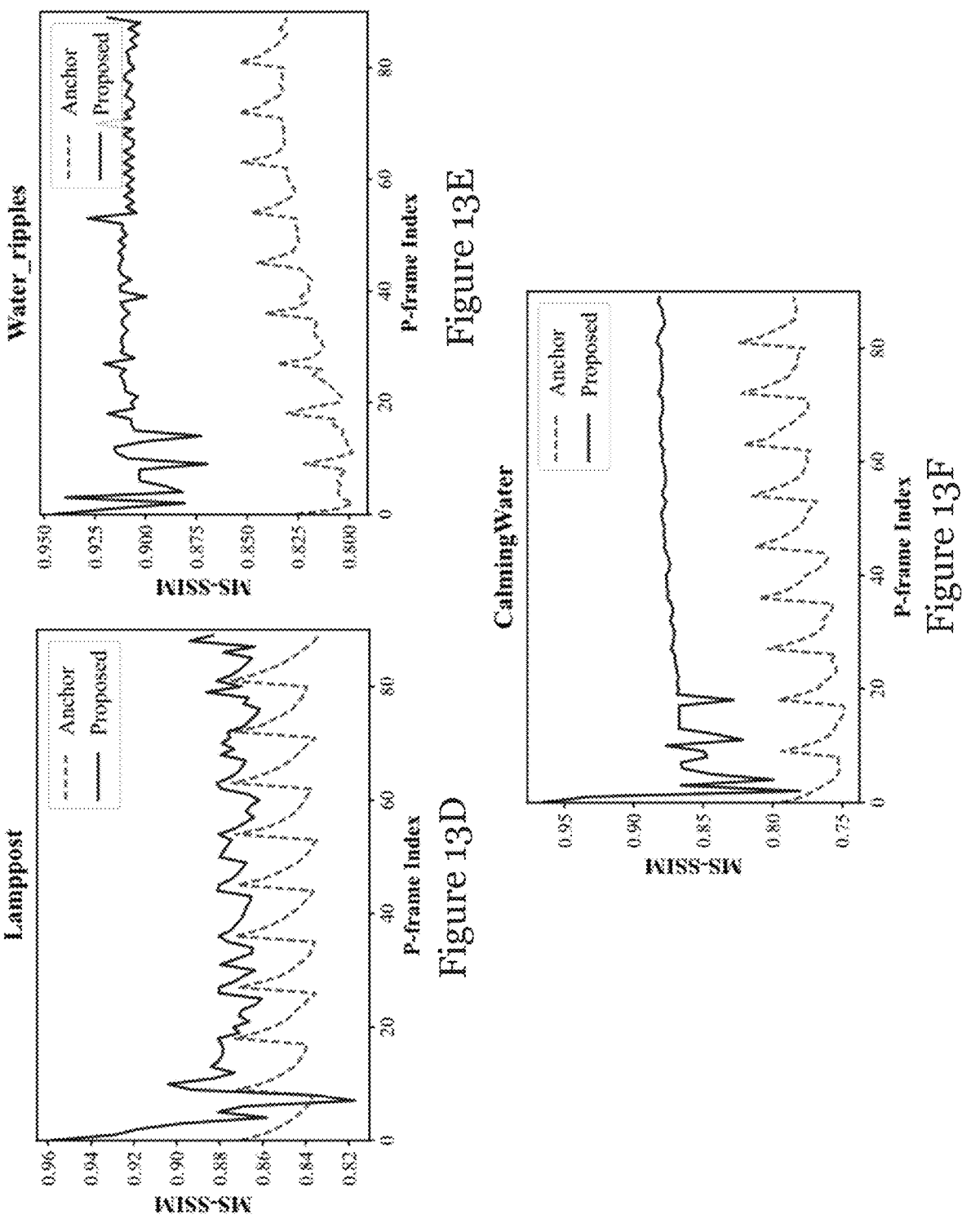
FIG. 13D is a graph showing quality fluctuation (multi-scale structural similarity index for motion detection (MS-SSIM) vs rate (bpp)) of the method in one embodiment of the invention ("Proposed", scale-adaptive rate control) and the reference DVC method ("Anchor", λ=64) on processing the video sequence "Lamppost" (target bitrate=3775 kbps)
FIG. 13E is a graph showing quality fluctuation multi-scale structural similarity index for motion detection (MS-SSIM) vs rate (bpp)) of the method in one embodiment of the invention ("Proposed", scale-adaptive rate control) and the reference DVC method ("Anchor", λ=64) on processing the video sequence "Water_ripples" (target bitrate=3002 kbps)
FIG. 13F is a graph showing quality fluctuation (multiscale structural similarity index for motion detection (MS-SSIM) vs rate (bpp)) of the method in one embodiment of the invention ("Proposed", scale-adaptive rate control) and the reference DVC method ("Anchor", λ=64) on processing the video sequence "CalmingWater" (target bitrate=8281 kbps)

The quality fluctuation of the compressed video frame, for DVC anchor and the rate control algorithm of this embodiment, are also illustrated. FIGS. 13A to 13F show quality fluctuation of the scale-adaptive rate control algorithm of this embodiment and DVC anchor with a λ value of 64. More specifically, the target bitrate of FIGS. 13A and 13D is 3775 kbps, the target bitrate of FIGS. 13B and 13E is 3002 kbps, and the target bitrate of FIGS. 13C and 13F is 8281 kbps. The quality values in terms of PSNR are provided in FIGS. 13A to 13C and the performance in terms of MS-SSIM are provided in in FIGS. 13D to 13F.

It can be seen from FIGS. 13A to 13F that after the adaptation of the rescaling R-D model, the results coded by the rate control algorithm of this embodiment (in solid lines) show higher quality and smaller range of fluctuation in terms of PSNR and MS-SSIM, when compared with the DVC scheme (in dash lines). These results demonstrate that the rate control algorithm in this embodiment can achieve better picture quality and quality consistency.

Figure 14C:
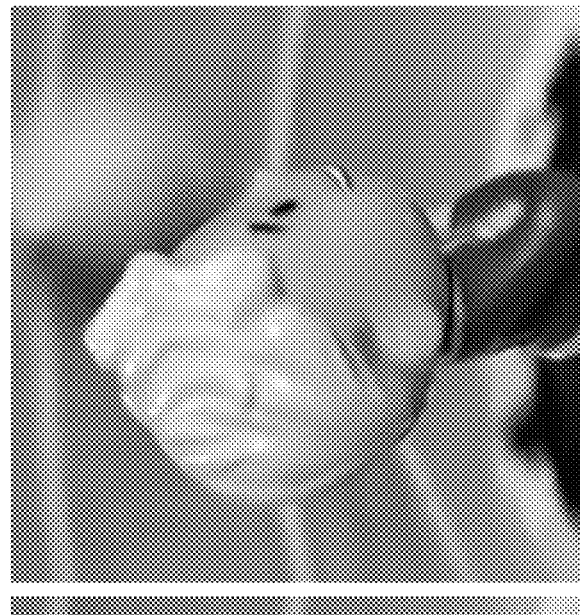
FIG. 14C is an image showing a reconstructed frame of the original frame of FIG. 14A, reconstructed using the method in one embodiment of the invention ("Proposed", scale-adaptive rate control, sequence bitrate=1633.8 kbps, PSNR=38.49 dB, MS-SSIM=0.9670, Frame coding bits=0.0221 bpp)
Figure 14B:
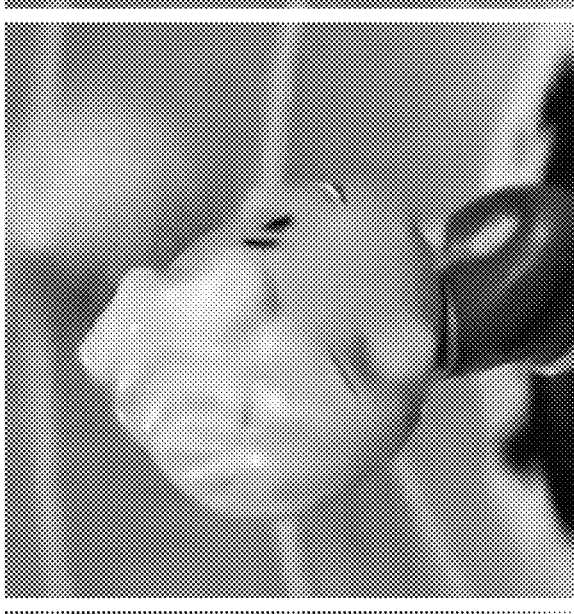
FIG. 14B is an image showing a reconstructed frame of the original frame of FIG. 14A, reconstructed using the reference DVC method ("Anchor", sequence bitrate=1627.9 kbps, PSNR=31.45 dB, MS-SSIM=0.9147, Frame coding bits=0.0288 bpp)
Figure 14A:
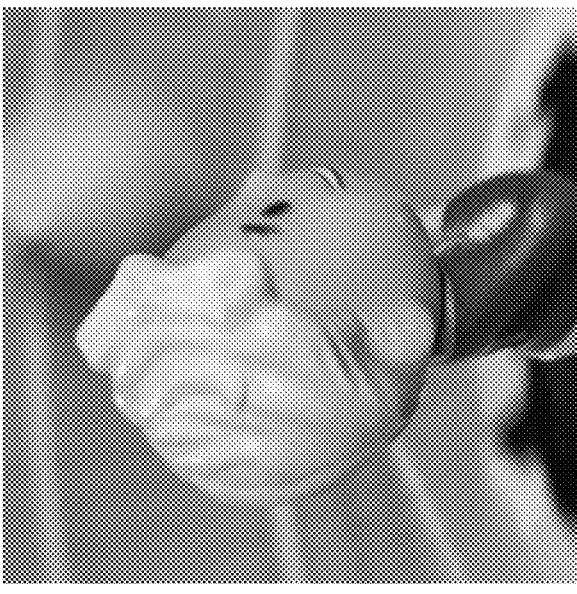
FIG. 14A is an image showing visual quality of an original frame.

FIGS. 14A to 15C show the visual quality results of DVC anchor and the rate control algorithm in this embodiment in low bitrate coding scenarios. Specifically, FIGS. 14A to 15C show visual quality comparisons between the original frame, reconstructed frames of DVC anchor and the rate control algorithm of this embodiment. FIG. 14A is an original frame. FIG. 14B is a corresponding reconstructed frame reconstructed using DVC (sequence bitrate=1627.9 kbps, PSNR=31.45 dB, MS-SSIM=0.9147, Frame coding bits=0.0288 bpp). FIG. 14C is a corresponding reconstructed frame reconstructed using the method of this embodiment (sequence bitrate=1633.8 kbps, PSNR=38.49 dB, MS-SSIM=0.9670, Frame coding bits=0.0221 bpp). FIG. 15A is an original frame. FIG. 15B is a corresponding reconstructed frame reconstructed using DVC (sequence bitrate=7903.6 kbps, PSNR=30.53 dB, MS-SSIM=0.8812, Frame coding bits=0.0338 bpp.). FIG. 15C is a corresponding reconstructed frame reconstructed using the method of this embodiment (sequence bitrate=7910.0 kbps, PSNR=34.49 dB, MS-SSIM=0.9450, Frame coding bits=0.0325 bpp).

The images in the FIGS. 14A to 14C are 600×600 sub-image cropped from the same region of the 64-th frame in "Bobblehead" sequence. From FIGS. 14A to 14C, it can be seen that the result of DVC anchor is blurred in the hair region and fails to reconstruct the ball in background, whereas the result of the method of this embodiment can better preserve details. For FIGS. 15A to 15C, the images are 600×600 patches selected from the same region of the 35-th frame in "Jockey". Compared to the DVC anchor, the result of the method of this embodiment provides clearer details in the horse, human face and the text in background board. The comparison results show that the scale-adaptive rate control algorithm of this embodiment can also bring visual quality improvement.

In this specific example illustrated with reference to FIGS. 8A to 15C, there is provided a relatively simple yet effective rate control in low bitrate coding scenarios algorithm for end-to-end video coding by introducing the scale-adaptive coding method, which converts the sparse distributed R-D points to the denser ones without introducing additional models. In this example, the generalized R-D models, which can be adapted to the video content during the coding process, are presented to jointly characterize the relationships among bitrate, distortion, rescale ratio and Lagrange multipliers. In this example, a model-based parameter determination strategy is devised to choose the optimal coding parameter frame-by-frame based on the generalized R-D models. Experimental results are presented to show that the rate control algorithm of this example can achieve accurate rate control with encouraging R-D performance and better bitrate smoothness quality consistency. In this example, due to the dense operational R-D points brought by scale-adaptive coding, new bitrates that are inaccessible by original separate-rate models are attainable by using these same models.

FIG. 16 shows an example data processing system 1600 in some embodiments of the invention. The data processing system 1600 can be used to perform at least part of one or more of the method embodiments of the invention, such as but not limited to the methods 200-600 and the frameworks 600, 1000 illustrated above. The data processing system 1600 can be used to perform video coding and/or decoding, or more generally, process digital video data. The data processing system 1600 generally includes suitable components necessary to receive, store, and execute appropriate computer instructions, commands, and/or codes. The main components of the data processing system 1600 are a processor 1602 and a memory (storage) 1604. The processor 1602 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), and/or any other digital or analog circuitry/circuitries configured to interpret and/or to execute program instructions and/or to process signals and/or information and/or data. The memory 1604 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1604. Computer instructions for executing or facilitating executing the method embodiments of the invention may be stored in the memory 1604. The processor 1602 and memory (storage) 1604 may be integrated or separated (and operably connected). Optionally, the data processing system 1600 further includes one or more input devices 1606. Examples of such input device 1606 include: keyboard, mouse, stylus, image scanner, microphone, tactile/touch input device (e.g., touch sensitive screen), image/video input device (e.g., camera), etc. The image/video input device (e.g., camera) may be used to capture a video for processing using one or more of the example methods of the invention. Optionally, the data processing system 1600 further includes one or more output devices 1608. Examples of such output device 1608 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The display may be used to display the video (before coding), the decoded video, etc. The data processing system 1600 may further include one or more disk drives 1612 which may include one or more of: solid state drive, hard disk drive, optical drive, flash drive, magnetic tape drive, etc. A suitable operating system may be installed in the data processing system 1600, e.g., on the disk drive 1612 or in the memory 1604. The memory 1604 and the disk drive 1612 may be operated by the processor 1602. Optionally, the data processing system 1600 also includes a communication device 1610 for establishing one or more communication links (not shown) with one or more other computing devices, such as servers, personal computers, terminals, tablets, phones, watches, IoT devices, or other wireless computing devices. The communication device 1610 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, 6G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1602, the memory 1604 (optionally the input device(s) 1606, the output device(s) 1608, the communication device(s) 1610 and the disk drive(s) 1612, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the data processing system 1600 shown in FIG. 16 is merely an example and that the data processing system 1600 can have different configurations (e.g., include additional components, has fewer components, etc.) in other embodiments.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

In some embodiments, there is provided an efficient rate control for end-to-end scale-adaptive video coding, by determining the optimal scale and λ given the bitrate budget. Some embodiments of the invention can convert the sparsely distributed rate-distortion points to the dense operational ones without having to introduce additional models. This leads to better rate control accuracy and rate-distortion performance improvement.

The above disclosure of some embodiments of the invention has provided, among other things, systematic rate-distortion analysis for the scale-adaptive end-to-end coding, and present a generalized rate-distortion model that characterizes the relationship among the coding parameters including λ, r and the rate-distortion performance. The model is useful for rate control for scale-adaptive end-to-end coding. The above disclosure of some embodiments of the invention has provided, among other things, a generalized rate-distortion model for coding parameters determination, which can achieve accurate rate control with promising rate-distortion performance, with the effectiveness of rate control in scale-adaptive end-to-end coding verified by experiments.

In some embodiments, the method is applicable for different end-to-end video compression methods with sparsely distributed rate-distortion points. In some embodiments, the scale-adaptive coding scheme can be applied to video sequences with arbitrary resolution. In some embodiments, the generalized rate-distortion models and the update strategy cam model the characteristics of different video sequences, and can provide an accurate rate-distortion relationships among the rate, distortion, rescale ratio, and λ.

Some embodiments of the invention can be used to control output bitrate for video compression.

It will be appreciated by a person skilled in the art that variations and/or modifications may be made to the described and/or illustrated embodiments of the invention to provide other embodiments of the invention. The described/ or illustrated embodiments of the invention should therefore be considered in all respects as illustrative, not restrictive. Example, optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). The video processing methods of some embodiments of the invention can be performed online in substantially real time. The video processing methods of some embodiments of the invention can be performed offline. The systems and methods of some embodiments of the invention can be applied to process videos such as screen content (i.e., non-camera-captured signals/content) video, camera-acquired natural scene content video, etc. The processing of the video (e.g., the coding and decoding) can be performed by the same device/system or by different devices and/or systems. The order of the method steps in the various illustrated method embodiments can be different from those illustrated, so long as technically feasible as appreciated by the skilled person. For example, some of the method steps may be performed sequentially (one after the other) whereas some of the method steps may be performed at least partly substantially at the same time. The video processing methods and systems of the invention can be used to process only part of the entire video, or the entire video.

The invention claimed is:

1. A method for processing a video, comprising:
(a) determining, based on one or more rate-distortion models and number of bits for a frame of the video, coding parameters for processing the frame, the coding parameters comprising a rescale parameter r and a video compression model λ, wherein the rescale parameter r comprises a rescale value or ratio for affecting resolution of the frame;
(b) employing the rescale parameter r as a controlling parameter with the video compression model λ for frame-level resolution adjustment and rate adaption, thereby obtaining an increased set of rate-distortion operating points;
(c) processing the frame by approximating a rate-distortion curve with the increased set of operating points obtained in (b), and selecting an optimal pair of the rescale parameter r and the video compression model λ for rescaling and encoding the frame, thereby forming at least part of a bitstream of the video;
wherein the one or more rate-distortion models are updated after the frame is processed, based on the processing of the frame in (c), to adjust at least the rescale parameter r for processing a next frame of the video.

2. The method of claim 1, wherein (c) comprises steps in an order of:
(c)(i) rescaling the frame based on the rescale parameter r determined in (a) to form a rescaled frame; and
(c)(ii) encoding the rescaled frame based on the video compression model λ determined in (a).

3. The method of claim 1, wherein the rescale parameter r further comprises a reference frame associated with the frame to facilitate encoding of the frame.

4. The method of claim 1, wherein the rescale value or ratio is arranged to match resolution of the frame and resolution of the reference frame.

5. The method of claim 3,
wherein the reference frame is a frame of the video before the frame of the video; and/or
wherein the frame and the reference frame are consecutive and/or continuous frames of the video.

6. The method of claim 1, wherein the one or more rate-distortion models comprises a rate model $f_R$ and a distortion model $f_D$.

7. The method of claim 6, wherein (a) comprises:
(a)(i) determining a set of coding parameters based the rate model $f_R$ and the number of bits for the frame, the set of coding parameters comprising multiple pairs of rescale parameter r and video compression model λ; and
(a)(ii) determining, based on the multiple pairs of rescale parameter r and video compression model λ and the distortion model $f_D$, the rescale parameter r and the video compression model λ for processing the frame of the video.

8. The method of claim 7, wherein the determining in (a)(ii) comprises:
determining, from the multiple pairs of rescale parameter r and video compression model λ, the rescale parameter r and the video compression model λ arranged to minimize distortion based on the distortion model $f_D$.

9. The method of claim 1, further comprising:
(d) processing the at least part of the bitstream to reconstruct a reconstructed frame corresponding to the frame.

10. The method of claim 9, wherein the processing in (d) comprises:
decoding the at least part of the bitstream to form a decoded frame corresponding to the frame or the reconstructed frame corresponding to the frame.

11. The method of claim 10, wherein the processing in (d) further comprises:
rescaling the decoded frame based on the rescale parameter r to form the reconstructed frame.

12. The method of claim 9, further comprising:
(e) updating the one or more rate-distortion models based on the processing in (d), for processing the next frame of the video.

13. The method of claim 1,
wherein the one or more rate-distortion models comprises a rate model $f_R$ and a distortion model $f_D$; and
wherein the updating comprises updating the rate model $f_R$ based on the processing in (c), for processing the next frame of the video.

14. The method of claim 13, wherein updating the rate model $f_R$ to comprises:

updating one or more parameters of the rate model $f_R$ based on an actual coding rate used for coding the frame and an estimated coding rate R determined based on the rescale parameter r, the video compression model $\lambda$, and the rate model $f_R$.

15. The method of claim 14, wherein the rate model $f_R$ is representable as $$R = f_R(\lambda, r) = \alpha_1 \cdot r^{\beta_1}$$

where R is coding rate, and $\alpha_1$ and $\beta_1$ are video content dependent parameters of video compression model $\lambda$.

16. The method of claim 15, wherein the updating of the rate model $f_R$ is based on $$\alpha_1^{new} = \alpha_1^{old} + \delta_a(\ln R_{real} - \ln R_{est}) \times \alpha_1^{old}$$
$$\beta_1^{new} = \beta_1^{old} + \delta_B(\ln R_{real} - \ln R_{est}) \times \ln r$$

where $\alpha_1^{old}$ and $\beta_1^{old}$ are video content dependent parameters of the rate model $f_R$ before the update, $\alpha_1^{new}$ and $\beta_1^{new}$ are video content dependent parameters of the rate model $f_R$ after the update, $\delta_\alpha$ is a constant, $\delta_B$ is a constant, $R_{real}$ is the actual coding rate, and $R_{est}$ is the estimated coding rate.

17. The method of claim 12, wherein the one or more rate-distortion models comprises a rate model $f_R$ and a distortion model $f_D$; and wherein the updating comprises updating the distortion model $f_D$ based on the processing in (d), for processing another frame of the video.

18. The method of claim 17, wherein updating the distortion model $f_D$ comprises:

updating one or more parameters of the distortion model $f_D$ based on an estimated distortion measure of the frame determined based on the distortion model $f_D$ and an actual distortion measure of the frame determined based on the processing in (d).

19. The method of claim 18, wherein the actual distortion measure is represented by an actual mean squared error (MSE) of the frame determined based on the processing in (d) and the estimated distortion measure is represented by an estimated mean squared error (MSE) determined based on the rescale parameter r, the video compression model $\Delta$, and the distortion model $f_D$.

20. The method of claim 19, wherein the distortion model $f_D$ is representable as $$D = f_D(\lambda, r) = \alpha_2 \cdot r^{\beta_2}$$

where D is distortion measure, and $\alpha_2$ and $\beta_2$ are video content dependent parameters of video compression model $\lambda$.

21. The method of claim 20, wherein the updating is based on $$\alpha_2^{new} = \alpha_2^{old} + \delta_a(\ln D_{real} - \ln D_{est}) \times \alpha_2^{old}$$
$$\beta_2^{new} = \beta_2^{old} + \delta_B(\ln D_{real} - \ln D_{est}) \times \ln r$$

where $$\alpha_2^{old} \text{ and } \beta_2^{old}$$

are video content dependent parameters of the rate model before the update, $$\alpha_2^{new} \text{ and } \beta_2^{new}$$

are video content dependent parameters of the rate model after the update, $\delta_\alpha$ is a constant, $\delta_B$ is a constant, $D_{real}$ is the actual distortion measure, and $D_{est}$ is the estimated distortion measure.

22. The method of claim 12, wherein the frame is a first frame; and wherein the method further comprises:

(f) determining, based on number of bits for a second frame and the one or more updated rate-distortion models, coding parameters for processing the second frame of the video, the coding parameters comprising a rescale parameter r and a video compression model $\lambda$; and (g) processing the second frame of the video based on the rescale parameter r and the video compression model $\lambda$ determined in (f) to form at least part of a bitstream of the video.

23. The computer-implemented method of claim 9, further comprising:

repeating steps (a) to (e) for each of at least some frames of the video.

24. A system for processing a video, comprising:

one or more processors; and memory storing one or more programs configured to be executed by the one or more processors, the one or more programs including instructions for performing or facilitating performing of the method of claim 1.

25. A non-transitory computer-readable storage medium storing one or more programs configured to be executed by one or more processors, the one or more programs including instructions for performing or facilitating performing of the method of claim 1.

\* \* \* \* \*